(12) United States Patent
Gloudemans et al.

(10) Patent No.: US 6,266,100 B1
(45) Date of Patent: *Jul. 24, 2001

(54) SYSTEM FOR ENHANCING A VIDEO PRESENTATION OF A LIVE EVENT

(75) Inventors: James R. Gloudemans, San Mateo; Richard H. Cavallaro, Mountain View, both of CA (US); Jerry N. Gepner, Langhorn, PA (US); Stanley K. Honey, Palo Alto, CA (US); Walter Hsiao, Mountain View, CA (US); Terence J. O'Brien, San Jose, CA (US); Marvin S. White, San Carlos, CA (US)

(73) Assignee: Sportvision, Inc., New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/160,534

(22) Filed: Sep. 24, 1998

Related U.S. Application Data

(60) Provisional application No. 60/099,262, filed on Sep. 4, 1998.

(51) Int. Cl.$^7$ ..................................................... H04N 5/265

(52) U.S. Cl. ........................... 348/587; 348/586; 348/584; 348/591; 348/705

(58) Field of Search .................................... 348/578, 580, 348/581, 582, 583, 584, 585, 586, 587, 588, 589, 590, 591, 592, 593, 596, 597, 598, 599, 600, 705, 706; H04N 5/265, 5/272, 5/268, 5/275

(56) References Cited

U.S. PATENT DOCUMENTS

| | | | |
|---|---|---|---|
| 3,580,993 | 5/1971 | Sandorf et al. ........................ 178/6 |
| 3,840,699 | 10/1974 | Bowerman .......................... 178/6.8 |
| 3,973,239 | 8/1976 | Kakumoto et al. ............... 340/146.3 |

(List continued on next page.)

FOREIGN PATENT DOCUMENTS

| | | | |
|---|---|---|---|
| 41 01 156 A1 | 1/1991 | (DE) . | |
| 1659078 A1 | 6/1991 | (SU) . | |
| WO 94/05118 | * 3/1994 | (WO) | .............................. H04N/9/75 |
| WO 95/10915 | 4/1995 | (WO) . | |
| WO 95/10919 | 4/1995 | (WO) . | |
| WO 97/03517 | * 1/1997 | (WO) | ............................ H04N/5/272 |
| WO97/41683 | 11/1997 | (WO) | ............................ H04N/5/262 |
| WO98/24243 | 6/1998 | (WO) | .............................. H04N/9/74 |
| WO98/28906 | 7/1998 | (WO) . | |
| WO99/38320 | 7/1999 | (WO) | ............................ H04N/5/265 |

OTHER PUBLICATIONS

Replay 2000—The Ultimate Workstation for Sport Commentators and Producers, Orad Hi–Tec Systems, Apr. 1995.

SailTrack, GPS Tracking System for Animated Graphics Broadcast Coverage of the America's Cup Races, 1992.

SailTrack Technical Overview, 1992.

Sail Viz Software Documentation, 1992.

*Primary Examiner*—David E. Harvey
(74) *Attorney, Agent, or Firm*—Vierra Magen Marcus Harmon & DeNiro LLP

(57) ABSTRACT

A three-dimensional model is created to represent an environment to be captured on video. A camera is fitted with pan, tilt and/or zoom sensors. An operator selects a location in the environment. The three-dimensional model is used to determine the three-dimensional coordinates of the location selected by the operator. Information from the pan, tilt and/or zoom sensors is used to transform the three-dimensional coordinates to a two-dimensional position in the video from the camera. Using the two-dimensional position of the video, a graphic is properly added to the video such that the graphic appears to be at the selected location in the environment.

46 Claims, 25 Drawing Sheets

U.S. PATENT DOCUMENTS

| | | | |
|---|---|---|---|
| 4,064,528 | 12/1977 | Bowerman | 358/22 |
| 4,067,015 | 1/1978 | Mogavero et al. | 343/225 |
| 4,084,184 | 4/1978 | Crain | 358/93 |
| 4,179,704 | 12/1979 | Moore et al. | 358/22 |
| 4,179,823 * | 12/1979 | Sullivan et al. | 348/123 |
| 4,319,266 | 3/1982 | Bannister | 358/22 |
| 4,386,363 | 5/1983 | Morrison | 358/22 |
| 4,420,770 | 12/1983 | Rahman | 358/183 |
| 4,521,196 | 6/1985 | Briard et al. | 434/20 |
| 4,591,897 | 5/1986 | Edelson | 358/22 |
| 4,612,666 | 9/1986 | King | 382/32 |
| 4,674,125 | 6/1987 | Carlson et al. | 382/49 |
| 4,700,306 | 10/1987 | Wallmander | 364/449 |
| 4,811,084 | 3/1989 | Belmares-Sarabia et al. | 358/22 |
| 4,817,171 | 3/1989 | Stentiford | 382/19 |
| 4,924,507 | 5/1990 | Chao et al. | 382/31 |
| 4,950,050 | 8/1990 | Pernick et al. | 350/162.13 |
| 4,970,666 | 11/1990 | Welsh et al. | 364/522 |
| 4,975,770 | 12/1990 | Troxell | 358/96 |
| 4,999,709 | 3/1991 | Yamazaki et al. | 358/160 |
| 5,063,603 | 11/1991 | Burt | 382/37 |
| 5,150,895 | 9/1992 | Berger | 273/29 R |
| 5,179,421 | 1/1993 | Parker et al. | 356/152 |
| 5,184,820 | 2/1993 | Keating et al. | 372/128 R |
| 5,207,720 | 5/1993 | Sheperd | 273/128 R |
| 5,249,039 | 9/1993 | Chaplin | 358/22 |
| 5,264,933 | 11/1993 | Rosser et al. | 358/183 |
| 5,305,107 | 4/1994 | Gale et al. | 548/590 |
| 5,313,304 | 5/1994 | Chaplin | 348/587 |
| 5,353,392 | 10/1994 | Luquet et al. | 395/135 |
| 5,398,075 | 3/1995 | Freytag et al. | 348/590 |
| 5,436,672 | 7/1995 | Medioni et al. | 348/591 |
| 5,450,140 | 9/1995 | Washino | 348/722 |
| 5,459,793 | 10/1995 | Naoi et al. | 382/165 |
| 5,465,308 | 11/1995 | Hutcheson et al. | 382/159 |
| 5,469,536 | 11/1995 | Blank | 395/131 |
| 5,479,597 | 12/1995 | Fellous | 3958/154 |
| 5,488,675 | 1/1996 | Hanna | 382/284 |
| 5,491,517 | 2/1996 | Kreitman et al. | 348/581 |
| 5,543,856 | 8/1996 | Rosser et al. | 348/578 |
| 5,564,698 | 10/1996 | Honey et al. | 273/128 R |
| 5,566,251 | 10/1996 | Hanna et al. | 382/284 |
| 5,592,236 | 1/1997 | Rosenbaum et al. | 348/586 |
| 5,610,653 | 3/1997 | Abecassis | 348/110 |
| 5,627,915 | 5/1997 | Rosser et al. | 382/219 |
| 5,668,629 | 9/1997 | Parker et al. | 356/139.05 |
| 5,808,695 | 9/1998 | Rosser et al. | 348/584 |
| 5,892,554 | 4/1999 | DiCicco et al. | 348/584 |
| 5,912,700 | 6/1999 | Honey et al. | 348/578 |
| 5,917,553 * | 6/1999 | Honey et al. | 348/578 |
| 5,953,076 | 9/1999 | Astle et al. | 348/584 |
| 6,100,925 | 8/2000 | Rosser et al. | 348/169 |

* cited by examiner

SYSTEM FOR ENHANCING A VIDEO PRESENTATION OF A LIVE EVENT

CROSS-REFERENCES TO RELATED APPLICATIONS

This Application claims the benefit of U.S. Provisional Application No. 60/099,262, A System For Enhancing A Video Presentation Of A Live Event, filed on Sep. 4, 1998.

This Application is related to the following Applications:

A Method And Apparatus For Enhancing The Broadcast Of A Live Event, by Stanley K. Honey, Richard H. Cavallaro, Jerry Neil Gepner, Edward Gerald Goren, David Blyth Hill, U.S. Ser. No. 08/735,020, filed Oct. 22, 1996;

Detecting A Tallied Camera, by Marvin S. White, Richard H. Cavallaro, James R. Gloudemans and Stanley K. Honey, filed the same day as the present application; and Blending A Graphic, by James R. Gloudemans, Richard H. Cavallaro, Stanley K. Honey and Marvin S. White, filed the same day as the present application.

Each of these related Applications are incorporated herein by reference.

BACKGROUND OF THE INVENTION

1. Field of the Invention

The present invention is directed to a system for enhancing a video presentation of a live event.

2. Description of the Related Art

The remarkable, often astonishing, physical skills and feats of great athletes draw millions of people every day to follow sports that range from the power of American football to the grace of figure skating, from the speed of ice hockey to the precision of golf. Sports fans are captivated by the abilities of basketball players to soar to the rafters, a baseball batter to drive the ball out of the park, a runner to explode down the track, a skier to race down the hill, a running back to break through the pack and make the first down, etc. In televising these events, broadcasters have deployed a varied repertoire of technologies—ranging from slow-motion replay to lipstick-sized cameras mounted on helmets—to highlight for viewers these exciting events.

One technology that can be improved is the use of graphics to highlight events and information, or to convey additional information, during a live event. For example, it would be useful during broadcasts of American football games to provide viewers with a visual guide indicating the location that the offense must advance to in order to earn a first down. When a receiver hooks back to catch a pass on third and long, a quarterback scrambles down field to keep a drive alive, or when a running back struggles for that extra yard to get the first down, the excitement to the television viewer would be enhanced if the video included a graphic showing the now-invisible first down line that those players are striving to cross.

An enhancement that would be helpful to viewers of golf tournaments is to highlight those portions of a golf course that have been notorious trouble spots to golfers. While the professional golfer is aware of these trouble spots and hits the ball to avoid those spots, the television viewer may not be aware of those trouble spots and may wonder why a particular golfer is hitting the ball in a certain direction. If the golf course was highlighted to show these trouble spots, a television viewer would understand the strategy that the golfer is using and get more enjoyment out of viewing the golf tournament. Another useful enhancement would include showing the contours of the green.

Similar enhancements to the playing field would be useful for other sports. For example, viewers of a ski jump, long jump or other similar event would be interested in seeing a graphic showing how far the first place or record-holding jumper has achieved. In a race, it would be of interest to know where a record holder had advanced to at a particular time. The number of applications for graphics is unlimited.

Furthermore, live events do not take advantage of the scope of the television audience with respect to advertising. First, advertisements on display at a stadium can be televised; however, many of those advertisements are not applicable to the television audience. For example, a particular sporting event may be played in San Francisco and televised around the world. A local store may pay for a billboard at the stadium. However, viewers in other parts of the United States or in other countries receiving the broadcast may not have access to that store and, thus, the broadcast of the advertisement is not effective. Second, some of the space at a stadium is not used for advertisements because such use would interfere with the view of the players or the spectators at the stadium, or because the stadium owner chooses not to use the space for advertisements. However, using that space for advertisements would be very effective for the television audience. For example, the glass around the perimeter of a hockey rink would provide an effective location for advertisements to the television audience. However, if such advertisements were physically present they would block the spectators' view at the stadium. Third, some advertisements would be more effective if their exposure is limited to particular times when customers are thinking of that type of product. For example, an advertisement for an umbrella would be more effective while it is raining.

One solution for using graphics with the video presentation of live events as discussed above includes digitizing a frame of video and using a computer with pattern recognition software to locate the target image to be replaced in the frame of video. When the target image is found, a replacement image is inserted in its place. However, this solution is not satisfactory because the software is too slow, cannot be effectively used in conjunction with a live event, cannot be used when the cameras are rapidly panning and cannot be used when multiple cameras are being rapidly tallied.

Thus, there is a need for an improved system that can use a graphic to enhance the video presentation of a live event.

SUMMARY OF THE INVENTION

The present invention is directed to a system for enhancing a video presentation of a live event. A three-dimensional mathematical model is created to represent an environment to be enhanced by a blending of graphics with video. One or more cameras are fitted with pan, tilt and/or zoom sensors. An operator selects a location (e.g. a point, a line, an arc or other shape) in the environment. The three-dimensional model is used to determine the three-dimensional coordinates of the location selected by the operator. Information from the pan, tilt and/or zoom sensors is used to convert the three-dimensional coordinates to a two-dimensional position in the video from the camera. Using the two-dimensional position in the video, a graphic is properly blended with the video such that the graphic appears to be at the selected location in the environment, displayed with the correct perspective.

One embodiment of the present invention includes pan, tilt and/or zoom sensors fitted to one or more cameras. The sensors are in communication with a computer having a processor and a processor readable storage unit for storing code to program the processor. The video signals from the cameras and the program signal are transmitted to a tally detector which determines which, if any, of the cameras are tallied. An operator can use the computer to select a location in the environment. The computer uses the data from the pan, tilt and/or zoom sensors to transform the coordinates of the selected location to a position in a frame of video from the tallied camera. Using the position in the frame of video, the graphic is rendered and blended with the frame of video from the tallied camera.

In one embodiment, the environment is a football stadium. Examples of a graphic include a logo (which can be an advertisement, emblem, etc.), a line or any other image (or set of images). The line can be used to show the location where the offense must advance to in order to achieve a first down. The line can also be used to show the line of scrimmage or other information. The present invention can be used with sports other than American football, as well as events that are not sports related.

These and other objects and advantages of the invention will appear more clearly from the following description in which the preferred embodiment of the invention has been set forth in conjunction with the drawings.

DETAILED DESCRIPTION

Figure 1:
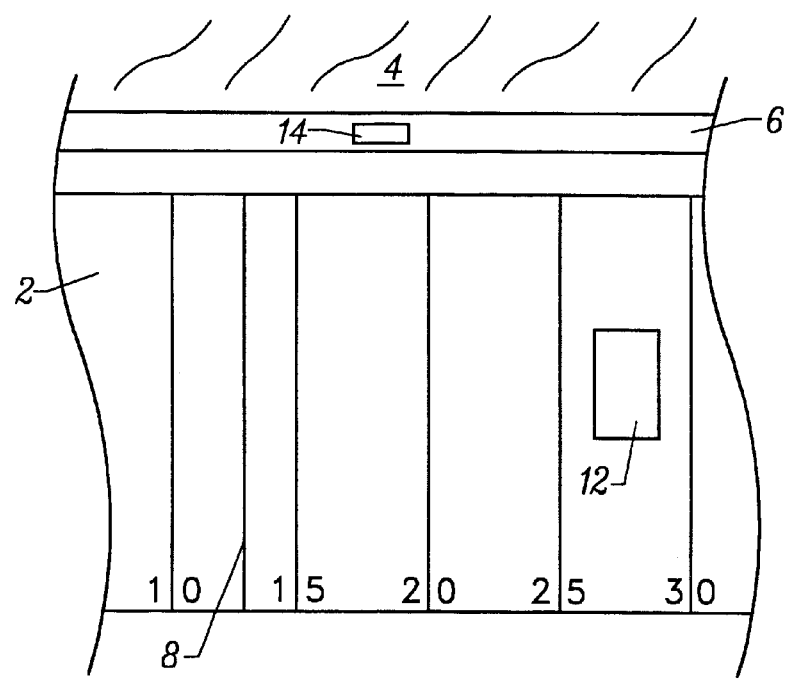
FIG. 1 depicts a portion of a football field.

FIG. 1 is a partial view of a stadium, which includes a football field 2. The stadium also includes a seating area 4 for fans. At the front of seating area 4 is a retaining wall 6 which separates seating area 4 from field 2. FIG. 1 depicts field 2 having a number of yard lines, including a ten yard line, fifteen yard line, twenty yard line and twenty-five yard line.

The present invention can be used to enhance a video representation of the football stadium. One exemplar enhancement is the blending of a graphic with the video. Video means an analog or digital signal depicting (or used to produce) moving images. Blending means combining at least a first image or video with at least a second image or video such that the result includes all or part of the first image or video and all or part of the second image or video. One example of how images are blended includes using a keyer to key one video over another video. One example of a graphic that can be blended to the video presentation of a football game is an additional yard line, which is depicted in FIG. 1 with reference numeral 8. Yard line 8 is not part of the original football field. Rather, the present invention blends the image of yard line 8 with the video so that it would appear to a viewer of the video that the yard line is actually on the field. One example of a suitable use of a "phantom" yard line is to show a line on the field that an offense needs to cross to make a first down.

Another example of a graphic that can be added to the video is a logo. Looking at FIG. 1, logo 12 can be blended with the video so that logo 12 also appears to be on the field 2. Logo 12 can be an advertisement, an information box, a team emblem or any other suitable graphic. A logo can also be placed in areas of the stadium other than on the field. For example, logo 14 is added to retaining wall 6. A logo can also be superimposed above the fans so that it looks like the fans are holding a giant billboard or the fans are holding cards that make up a billboard. Other places to put a logo could include any space above the stadium, space between the goal posts, or other surfaces in the stadium. Yard lines and logos must be added to the video at the right location, and with the right perspective, to look realistic. In one embodiment, a yard line can be thought of as a logo (e.g. a subset of the set of possible logos). When the present invention is used to enhance the video image as discussed above, the spectators and players at the stadium would not see any of these enhancements.

In some embodiments, the blending of a graphic must take into account occlusions. That is, if a player steps on top of the area where the yard line or logo is, the yard line or logo should not be drawn on the player. The player should appear to be stepping on or standing in front of the graphic.

A first down line can be depicted by drawing a line across the field. This line can be a black or white line, or any other suitable color (e.g. red). The line can be bold, thin, thick, shaded, blinking, dotted, dashed, tapered, etc. In one embodiment, the line or other graphic is displayed to show a certain significance such as having a first down line blink on third down or change color when the offense is near the goal line. The enhancement need not even be a line. The graphic may be another shape or form that is appropriate. In addition to blending two images, the enhancement can be made by editing an image, adding an image, replacing an image with another image, highlighting an image using any appropriate method of highlighting, other suitable graphical enhancements to the video, etc. Furthermore, the enhancements are not restricted to showing first down lines and logos. Any other graphic can be added to or deleted from any suitable surface or portion of the stadium (including the field). For example, a graphic could be added to show more people in the stands.

Figure 2:
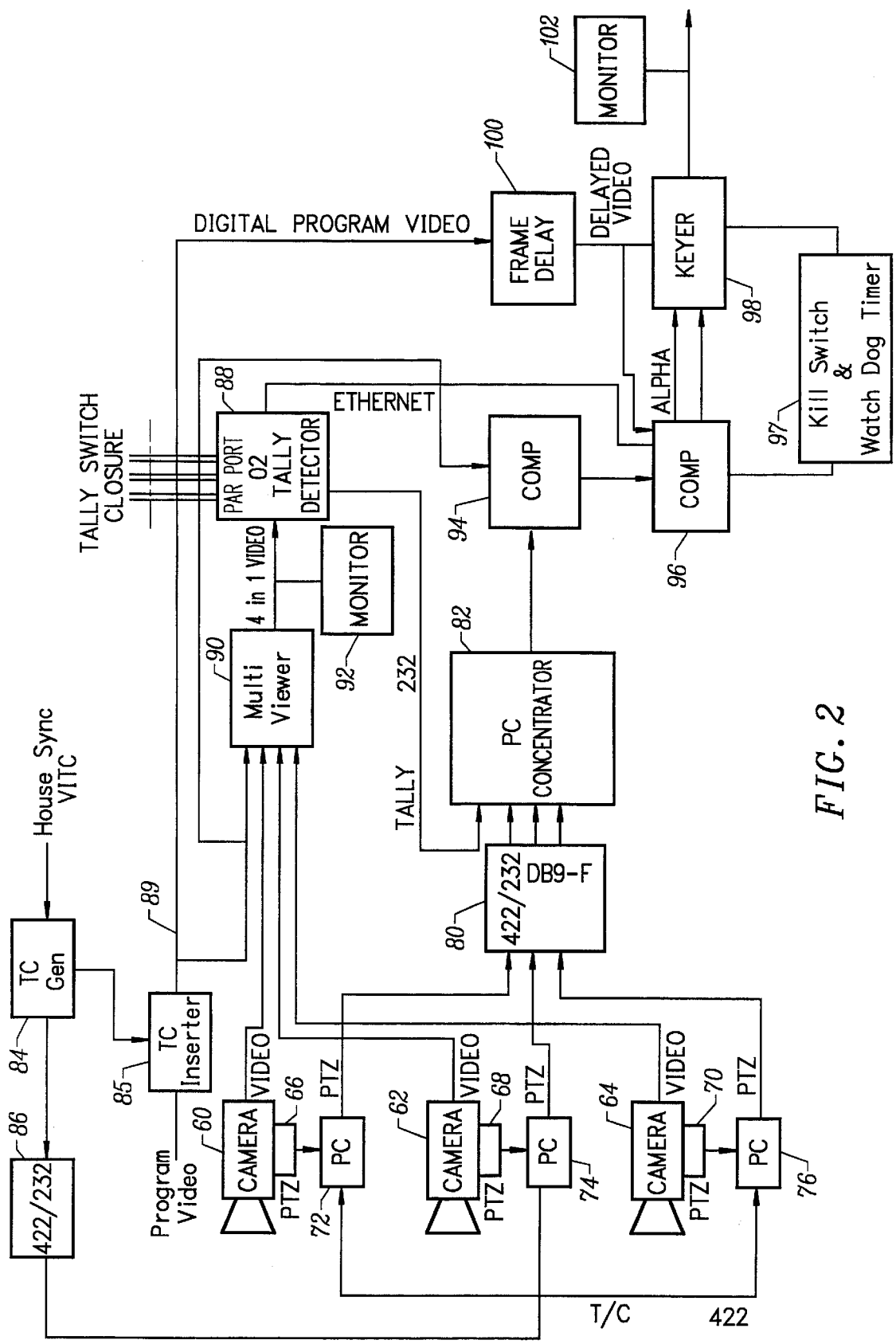
FIG. 2 is a block diagram of one exemplar set of hardware used to implement the present invention.

FIG. 2 is a block diagram of the hardware components that comprise one embodiment of the present invention. FIG. 2 shows three video cameras 60, 62 and 64. Alternative embodiments can include more than three cameras or less than three cameras. The present invention will also work with only one camera. Each camera has associated with it one or more camera view sensors. For example, camera 60 includes camera view sensors 66, camera 62 includes camera view sensors 68 and camera 64 includes camera view sensors 70. A set of camera view sensors can include one or more of the following: a zoom sensor, a pan sensor and/or a tilt sensor.

Connected to each camera is a 2X Extender, a zoom lens and a means of focusing the camera. A zoom sensor will receive an electrical signal from all three of these devices in order to sense the zoom of the camera, the focal distance of the camera and whether the 2X extender is being used. The analog signal is converted to a digital signal and transmitted to a local computer. Each of the cameras is associated with a local computer. For example, camera 60 is associated with local computer 72, camera 62 is associated with local computer 74 and camera 64 is associated with local computer 76. Local computers can be a 486 processor based machine, a Pentium processor based machine, a Macintosh platform, a dedicated microcontroller or another type of computer/processor. In one alternative, the zoom sensor would include a digital output and, thus, there would be no need for an analog to digital converter. In one embodiment, a camera may also include one or more inclinometers (measures tilt) or one or more rate gyro (measures tilt rate).

Each of the cameras also include a pan/tilt head that enables the camera to pan and tilt. Attached to the pan/tilt head is a pan sensor and a tilt sensor. In one embodiment, the pan/tilt head is part of the camera. In another embodiment, the pan/tilt heads is part of a tripod. One embodiment uses separate pan and tilt heads. The local computers (72, 74 and 76) include a pan and tilt electronics board for receiving electrical signals from the pan and tilt sensors. These boards can convert the signals into a usable signal for the processor inside the local computers. Additionally, each of the local computers may also include memory, hard drives and appropriate input/output devices. In one embodiment, a particular camera may not have either a pan head, a tilt head or a zoom lens. If one of these options are missing, there is no need for the corresponding sensor.

In one embodiment, the pan sensor and the tilt sensor are optical encoders that output a signal, measured as a number of counts (or pulses), indicating the rotation of a shaft. Forty thousand (40,000) counts represent a full 360° rotation. Thus, a processor can divide the number of measured counts by 40,000 and multiply by 360 to determine the pan or tilt angle in degrees. The pan and tilt sensors use standard technology known in the art and can be replaced by other suitable pan and tilt sensors known by those skilled in the relevant art. The pan and tilt electronics board inside the local computer receives the output from the pan and tilt sensors, converts the output to a digital signal, stores the results and transmits a digital signal of suitable format to the processor in the local computer. The pan, tilt and zoom sensors are used to determine the corresponding camera's view. Thus, one or more of the pan, tilt or zoom sensors can be labeled as a camera view sensor(s). For example, if a camera cannot zoom or tilt, the camera view sensor would only include a pan sensor. The "camera view" is defined as that which is viewed by the camera. With some cameras, the camera view can be determined by looking in the camera's view finder.

The output signals of local computers 72, 74 and 76 are sent in RS-422 format to an RS-422-to-RS-232 converter 80 for purposes of converting the format of the signal to RS-232. The information sent by local computers 72, 74 and 76 includes the pan, tilt and zoom data measured for cameras 60, 62 and 64, respectively. After converting the signals to RS-232, converter 80 sends all three signals to PC concentrator 82. PC concentrator 82 also receives a signal from tally detector 88. All the signals received by PC concentrator 82 are combined into one serial signal and sent to main computer 94. One embodiment includes sending all the signals directly to computer 94 and eliminates the need for PC concentrator 82. In one alternative, the signals from the local computer can be transmitted via the microphone channel of the video signals from the camera.

The video outputs of cameras 60, 62 and 64 are sent to multiviewer 90. In addition, the video outputs are also sent to a production truck used to produce the video presentation of the live event. The production truck may receive signals from many different video cameras. The producer chooses which video signal to broadcast. The video signal being broadcast is called the "program signal" or "program video." The program signal is also sent to multiviewer 90. In one embodiment, the cameras output an analog video signal. In another embodiment, the cameras output a digital video signal. In another embodiment, the cameras output analog signals which are converted to digital signals. The system can work with analog signals or digital signals, as long as the appropriate multiviewer is chosen. For example, a multiviewer that can accept digital inputs includes the Video Gainsville CVX64Q. An example of a multiviewer that can accept analog inputs includes the Panasonic WJ-420 quad unit or FOR-A MB-40E. Using digital signals may improve the accuracy of tally detector 88. Multiviewer 90 combines the four input video signals into one signal which is sent to tally detector 88 and monitor 92. A suitable multiviewer can be used with less than four or more than four signals. Alternatively, if the tally detector can receive more than one input, there may not be a need for the multiviewer. Monitor 92 (optional) is used by an operator to monitor the video signals being sent to tally detector 88.

Tally detector 88 determines which (if any) of the three cameras 60, 62 or 64 is tallied. A camera is said to be tallied if it is the primary source of the video chosen by the producer to be broadcast. With respect to the system of FIG.

1, a camera is tallied if it is the primary source of the video being sent on signal 89. Tally detector 88 sends to PC concentrator 82 an indication of which (if any) of the three cameras is tallied. In a system which has only one camera, there is no need for a tally detector. In a system that has more than three cameras, the tally detector can be designed to determine which of the many cameras is tallied.

The system also receives a house time code or house sync 83 used by the broadcaster. Time code generator 84 accepts signal 83, interprets the VITC/LTC signal and converts that signal to an RS-232 signal which is sent to converter 86 and time code inserter 85. Converter 86 accepts the RS-232 signal and converts it to RS422. The output of converter 86 is sent to local computers 72, 74 and 76. The local computers append time codes to the field of view data. In an alternative embodiment, the output of generator 84 is transmitted to PC concentrator 82. Time code inserter 85 receives the RS-232 signal from generator 84 and also receives the program video signal. Time code inserter 85 inserts time codes into the program video and sends the program video with time code, signal 89, to multiviewer 90, computer 94 and frame delay 100. The time code is used to match the field of view data with the correct frame of video. The time code is also used to synchronize the timing between computers 94 and 96.

PC concentrator 82 sends the camera view data from all three cameras and the tally indication to computer 94. In one embodiment, PC concentrator 82 is a computer that also provides the user interface for the operator to choose the location to enhance. In another embodiment, the operator uses computer 94 to select the location to enhance. Using a model, computer 94 determines the three-dimensional coordinates of the selected location. Using the camera view data received from the local computers 72, 74 and 76, main computer 94 also determines the position of the selected location in the video signal from the camera that has been tallied. That information can be used to blend a graphic with the video signal at or near the determined position. Computer 94 and computer 96 work together to create the graphic and a set of associated alpha signals. Both the graphic and alpha signals are sent to keyer 98. An alpha signal that is sent to keyer 98 is also called a key signal. Each pixel has its own key or alpha value. The graphic signal can be sent as a YUV signal RGB signal, YCbCr signal or other appropriate signal according to the specifications of the keyer. Keyer 98 also receives a video signal from frame delay 100. Frame delay 100 receives video signal 89 and delays video signal 89 to account for the processing time of computers 94 and 96, collection of data, as well as other delays from the production. In one alternative, a computer can be used to blend the graphic instead of using a keyer. For example, either computer 94 or computer 96 can be used, or an additional computer can be used.

The graphic sent from computer 96 to keyer 98 is called foreground and the signal from frame delay 100 is called background. Based on the level of the alpha or key from computer 96, keyer 98 determines how much foreground and background to blend on a pixel by pixel basis. Keyer 98 can blend from 100% foreground and 0% background to 0% foreground and 100% background. In one embodiment, the key or alpha for a pixel can range from 0 %–100% (or 0–1, or another similar range as per the specification of the keyer). The output of keyer 98 can be broadcast, recorded or both. This output of keyer 98 is also sent to a monitor 102 for reviewing by the operator of the system.

Kill Switch/Watch Dog Time 97, which is in communication with computer 96 (via signal WDT) and keyer 98, can be used by an operator to enable or disable the keying of the graphic. Additionally, the Watch Dog Timer automatically disables the keying of the graphic if the WDT signal from computer 96 stops sending a periodic signal. In one example, the WDT signal is a pulse sent for each frame or for each field. The Watch Dog Timer may disable the keying if the pulses stop for a predefined amount of time, frames or fields. For example, the Watch Dog Timer may disable the keying if the pulses stop for two frames.

As an option, the system could also include a data inserter for inserting non-video data into a television signal. Non-video data is information other than traditional data used by a television to draw the normal scan lines on a television display. An example of non-video data is data transmitted during the vertical blanking interval, which can be closed-caption data, statistics regarding the game, interactive queries or Internet addresses. The optional data inserter can receive the television signal from keyer 98 and insert the non-video data into the vertical blanking interval of the television signal. The output of the data inserter would be broadcast, recorded or both. In one embodiment, a data inserter can insert into the video signal instructions for a computer to enhance the video. At the viewer's home will be a set-top box which can read the instructions from the received signal and pass the information to a computer. The computer can receive the information from the set-top box and receive the video. The computer can use the instructions to blend the graphic with the video. Thus, a viewer can customize and control the enhancements using the viewer's personal computer. Alternatively, the set-top box will be capable of applying the enhancement.

In one embodiment, computer 94 and tally detector 88 are O2 workstations from Silicon Graphics, and computer 96 is an Indigo 2 Impact from Silicon Graphics. In other embodiments, other suitable computers can be used. It is noted that these computers typically include processors, memory, disk drives, monitors, input devices, output devices, network interfaces, etc. In one embodiment, an Ethernet is set up between computer 94, computer 96 and tally detector 88. The Ethernet is used for maintenance purposes and communication from computer 94 to computer 96.

Figures 3, 4:
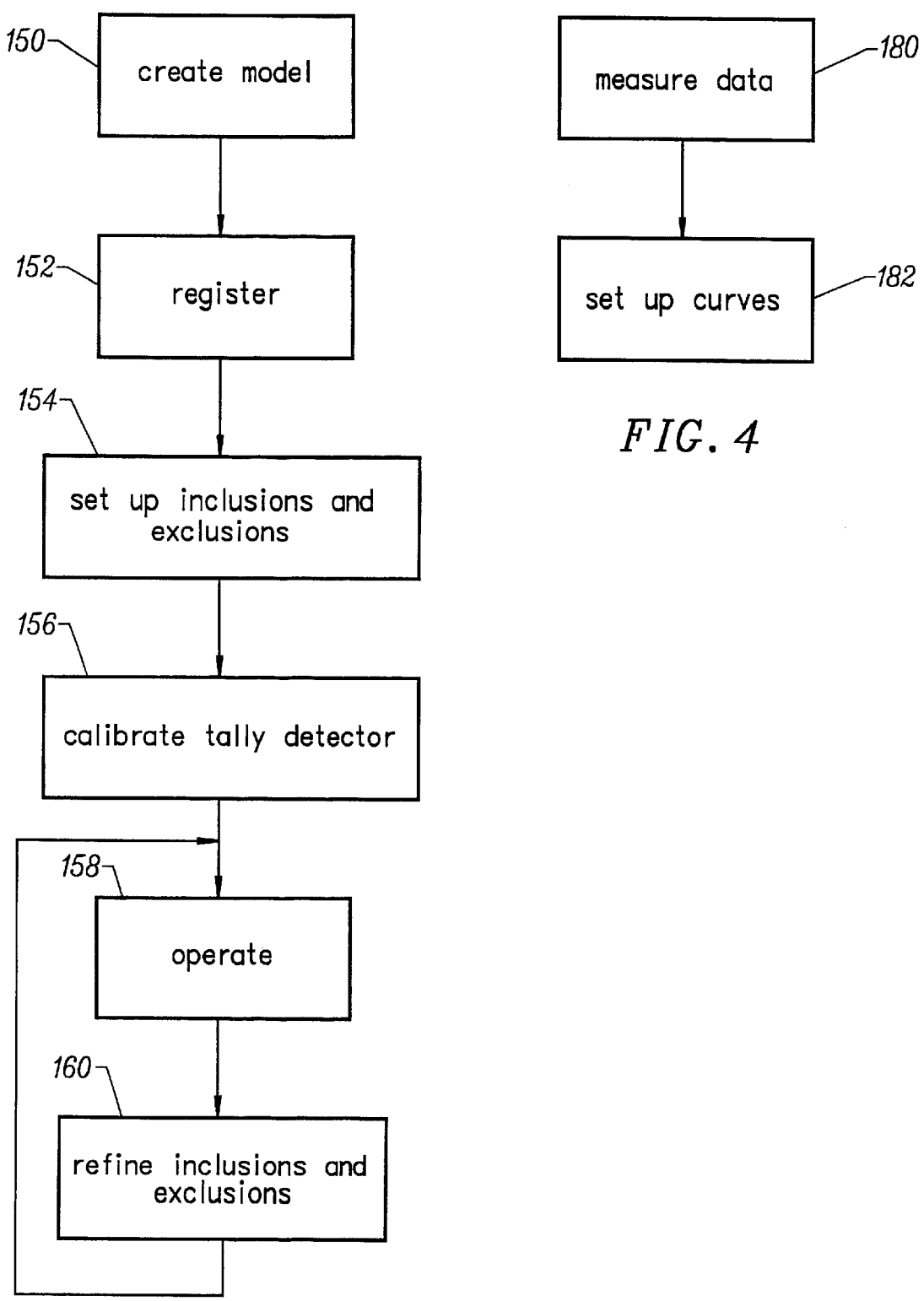
FIG. 3 is a flow chart describing the overall process of using the current invention.
FIG. 4 is a flow chart describing the step of creating a model.

FIG. 3 describes the basic operation of the system described in FIG. 2. In step 150, the user of the system creates a mathematical model of the environment whose video image will be enhanced with the graphic. If the system is being used to add a yard line to a football field, then the environment would only include the football field and step 150 would include creating a model of the football field. If the user intends to add a graphic to other portions of the stadium, then the environment must include those other portions of the stadium as well. The model created is a three-dimensional model of the environment. For example, if the environment to be modeled is a football field, the model would include a description of the surface of the football field. Most football fields are not flat surfaces, and include crown for drainage purposes. Additionally, many fields include other variations in the height (and possibly length and width) of the field due to errors and other abnormalities. Thus, the model will serve as a three-dimensional representation of the surface of the field. If the environment includes portions of the stadium, then the model will include the relevant contours of the stadium such as any retainer walls, the top of the stands and any other surface the user may want to add a graphic to.

In step 152, the operator of the system registers the system. The step of registering will be discussed in more detail below. In step 154, the operator will set up inclusions and exclusions. In one embodiment of the present invention, the graphic can simply be added to the video without taking into account the contents of the video signal. There will be no accounting for occlusions; for example, a player or object in front of the enhancement. In another embodiment, the system can include inclusions and/or exclusions. An inclusion is a color range for a pixel that can be enhanced using the present invention. An exclusion is a color range for a pixel that should not be enhanced using the present invention. During operation, the operator can set up one or more inclusions and/or one or more exclusions. For example, the operator may decide that a yard line can be drawn over white (the original yard lines), green (grass) and brown (dirt). Additionally, the operator may want to set up an exclusion so that a line is not drawn over a specific color (e.g. team's uniforms). In an alternate embodiment of the present invention, exclusions also include video frame pixel locations that are not to be enhanced. In step 156, tally detector 88 is calibrated. In step 158, the system is operated during the live event. In step 160, the inclusion and exclusion zones can be modified or deleted, or new inclusion and/or exclusion zones can be created. Step 160 is an optional step that can be performed while the system is being operated (step 158) or before the system is operated. Thus, the inclusion zones and exclusion zones can be created and modified during a live event while the system is being operated.

FIG. 4 is a flow chart explaining this method of creating the model (step 150 in FIG. 3). In step 180, an operator will measure data from different points in the environment. In one embodiment, each data point includes x, y and z values. Any method can be used to obtain these x, y and z values. One example of a suitable method is to use a laser plane for z values and a laser range finder for x and y values, or other surveying devices. Suppose that the environment being modeled is the football field of FIG. 1. The first step is to create a coordinate system. For simplicity, assume the origin is at the near corner of the left end zone, the y-axis is along the width of the field (e.g. the back of the end zone), the x-axis is along the length of the field (e.g. the side line) and the z-axis extends vertically from the field. The operator can measure or use the yard markings on the field to determine the x and y coordinates for most points of interest on the field. The laser plane can be used to measure the corresponding z coordinate. The laser plane is utilized by placing the laser plane at the origin (or another point) and reading the laser image off a pole that is positioned at the point of interest. In one embodiment, data samples are taken for the back of both end zones, both goal lines, both 20 yard lines and both 40 yard lines. For each yard line measured, measurements should at least be taken at each side line and in one or more points between the side lines, including the middle of the field. Additional data points can also be taken. If the environment includes parts of the stadium, the laser plane, a measuring tape or another measuring device can be used (as well as simple geometry) to determine data for other points in the environment.

In one embodiment, the data points measured in step 180 can be used to simply create the model. That is, data points can be plotted and connected (symbolically). In another embodiment, a set of curves are created (step 182) using the measured data. That is, if the data is taken for a number of points along a line (e.g. 20 yard line, 40 yard line, edge of a wall, etc.) then that line can be modeled by fitting the data into a curve of the form $A+By+Cy^2=z$. Thus, any point on a yard line can be found using that equation because it is assumed that every point on the yard line has the same x value. As the y value changes, the z value will also change. Similar curves can be used to represent other lines. For example, a side line (as opposed to a yard line) can be modeled with the equation of the form $A+Bx+Cx^2=z$. Other lines in the environment can use either one of these two equations or different equations. If the system wants to find the z value for a point between two curves, the system can use linear interpolation.

Figure 5:
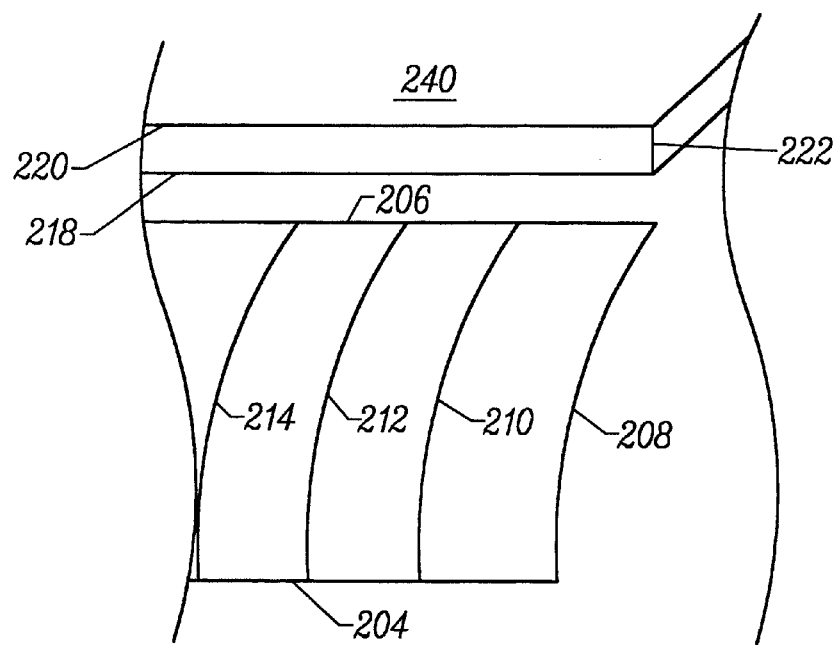
FIG. 5 is a symbolic representation of a mathematical model.

After step 182 is complete, the system has a set of curves. This set of curves constitutes the model. FIG. 5 is a symbolic (or graphical or schematic) representation of such a model. Curves 204 and 206 represent the side lines and curve 208 represents the back of the end zone. Curves 210, 212 and 214 represent yard lines. Curves 218, 220 and 222 represent the contours of the wall surrounding the stands. In one embodiment, a plane 240 can be defined to represent the fans. In one embodiment, the model is stored as a database and can be drawn by any of the computers discussed above. Thus, the model can exist as a database and can be rendered as an image.

Figure 6:
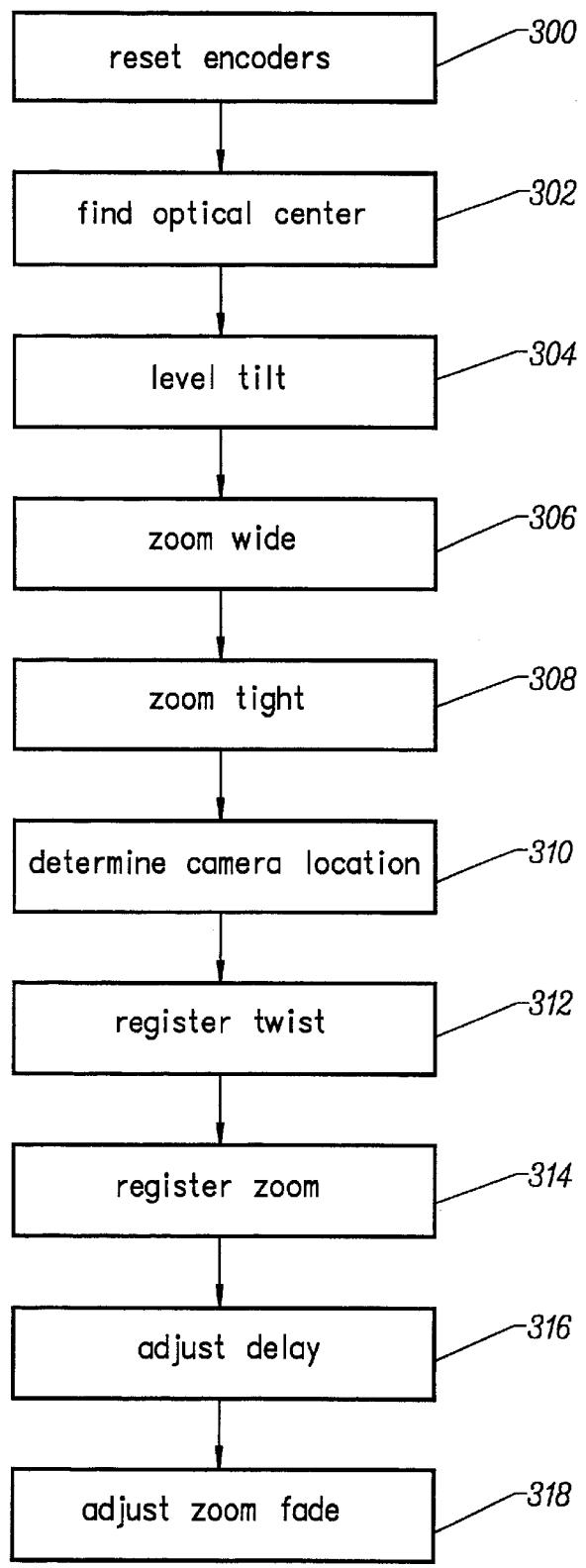
FIG. 6 is a flow chart describing the step of registering the system.

FIG. 6 is a flow chart which explains the method for registering the system (step 152 of FIG. 3). In step 300, the operator will reset the encoders for all of the pan and tilt sensors. That includes moving the cameras through the range of motion to pass the zero count index reference point for each of the encoders. In step 302, the optical center (or optical axis) is found for each camera and each extender setting. To do so, the camera's cursor (e.g. cross hair) is positioned in the center of the camera's viewfinder and the camera is zoomed in to the tightest zoom. The camera is positioned (panned and tilted) so that the cursor is centered on a fixed location. At that point, the camera is zoomed out to the widest zoom. If the cursor is still centered on the fixed location, the cursor is located on the optical axis. If the cursor is not centered on the fixed location, (while the camera is still zoomed out) the cursor is moved, without moving the camera, so that the cursor is now centered on the fixed location in the viewfinder. The camera is then zoomed in to the tightest zoom. If the cursor is still centered on the fixed location, then the cursor is located on the optical axis. Otherwise, the camera is moved such that the cursor is centered on the fixed location. This process will continue until the cursor remains on the fixed location while the camera is zoomed in and out. This process will be repeated both for the 1X setting and the 2X setting of the 2X Extender.

In step 304, the level tilt reading is found. Level tilt is the tilt of the camera when the optical axis is perpendicular to the force of gravity. Level tilt is found by setting the laser plane next to the camera at the level of the camera's lens. A stick or other object that can be used to view the marking from the laser plane should be placed across the stadium at a height to receive the beam. By pointing the optical center of the camera on the point illuminated on the stick by the laser plane across the stadium, the camera is brought to level tilt. The tilt registration parameter, which is referred below, is the encoder reading in degrees (or radians) at level tilt. Prior to determining level tilt, a digital level is placed on the camera and the camera is panned to ensure that the pan axis is vertical. If it is not, suitable adjustments are made. In an alternative, a pan axis that is not vertical can be modeled (rather than corrected). In another embodiment, one or more inclinometers can be connected to the base of the pan and tilt heads, in order to more accurately measure and, perhaps, model the attitude of the pan axis. This allows for toleration of shifts in camera attitude. Radio frequencies sometimes cause noise in the pan and tilt sensors. To compensate, the zero count mark is moved so that it is in the typical center of the camera's view.

In step 306, the zoom lens is opened to its widest angle and its output voltage is recorded. In step 308, the zoom lens is zoomed to the tightest zoom and its output voltage is recorded. Steps 306 and 308 are used to determine the range of the zoom voltages. In one embodiment, the zoom sensor includes adding a wire to read an output voltage from a zoom lens. Alternatively, a zoom lens can output a digital signal that describes the state of the zoom lens.

In step 310, the system determines the location (x, y and z coordinates) of the cameras. To determine the x and y coordinates of a particular camera, a camera's optical center is pointed to three or more (e.g. 8) known fiducials. A known fiducial is a marking or location whose coordinates are known by accurately measuring the coordinates in relation to the origin. The coordinates of a fiducial can be measured using a laser plane, tape measure, and/or other suitable methods. While pointing the camera at the known fiducials, the system counts the pan sensor counts between the fiducials. Each count represents 0.009 degrees of pan. Geometry can be used to form triangles connecting the camera to all the fiducials, determining the angles between the different lines using the number of pan sensor counts and solving (using numerical solver software) for the x and y coordinates of the one point that can best satisfy all the data. One caveat is that all of the fiducials must not be on the same straight line.

To get the z coordinate of a camera, a camera is pointed to a known fiducial (once the x, y position is known). By pointing to, it is meant that the camera is panned and tilted so that the optical center is placed on the known fiducial in the camera's viewfinder. The system can detect the number of counts on the tilt sensor from the level tilt position. These counts can be used to compute an angle θ. Using geometry, a right triangle can be drawn where one vertex is the fiducial, a second vertex is the camera and the third vertex is the point directly beneath the camera (at the z coordinate of the fiducial) necessary to make the right triangle. One of the angles in the triangle will be θ and the other angle will be 90 −θ. The system knows the x and y coordinates for all three vertices, thus the bottom of the triangle's length is already known. Thus, the height of the triangle, which is the z coordinate of the camera's location, can be determined using known trigonometry. This can be repeated for multiple fiducials and the result can be averaged for a more accurate solution.

To determine the pan registration parameter (discussed below), a camera's optical center is pointed to a fiducial. The pan encoder reading in degrees (θ) is noted. The x, y coordinates of the fiducial $(x_1, y_1)$ are noted. The x, y coordinates of the camera are noted $(x_2, y_2)$. An angle Φ is determined as:

$$\Phi = \tan^{-1}\left(\frac{y_1 - y_2}{x_1 - x_2}\right)$$

The pan registration parameter is computed as

*Pan Reg*=180°−θ−Φ

In step 312, a twist parameter is determined for each camera. A camera is pointed to the field (or other portion of an environment) and the output of the camera is sent to computer 94. The image from the camera is superimposed over a transformed image of the model of the environment. A slider on a graphical user interface (GUI) is used to alter the twist of the camera image so that it completely aligns with the image of the model. The degree of alignment correction is recorded as the twist registration parameter. Note that the transformation of the image of the model is performed with the best parameters known at the time.

In step 314, the system registers zoom for each camera. The video from the camera is sent to computer 94 and is superimposed on top of a transformed image of the model. First, the camera will be zoomed to its widest position and a second slider on the GUI will be moved until the image from the camera is aligned (expand or shrink) with the image of the model. At this point, the system will store the zoom voltage, the focus voltage and a zoom factor to be used to align the image to the model. The system will record data points at at least five (could also be six or twelve or another number) different zoom measurements with the Extender at 1X and four zoom measurements with the Extender at 2X. The data will be used to create two curves that map zoom voltage to zoom factor: one curve for the extender at 1X position and one curve for the extender at 2X position. In an alternative embodiment, four curves can be generated: near focus and 1X, near focus and 2X far focus and 1X and far focus and 2X. Interpolation will be used for points between the curves.

In step 316, the system attempts to create a compensation factor for the delay of pan, tilt and zoom data with respect to the video signals from the cameras. To do this the pan, tilt and zoom data is used to superimpose a graphic on the video from a camera. The camera is panned back and forth. Using a slider on a GUI, delay is added to the graphic rendering so that the motion of the graphic in relation to the original video is eliminated. This delay factor is used to correlate pan, tilt and zoom data to video.

In step 318, the system adjusts zoom fade and zoom cut off. That is, in some embodiments it may be desirable that the graphic is not added to the video if the camera is zoomed in beyond a threshold. Thus, an operator can set a first zoom threshold, at which point any graphic being added to a video will start to fade. The operator can also choose a cut-off zoom threshold. When the camera zooms passed the cut-off threshold the graphic is completely faded out. The amount the line has faded depends on how far zoomed the camera is between the first zoom threshold and the cut-off threshold.

Figure 7:
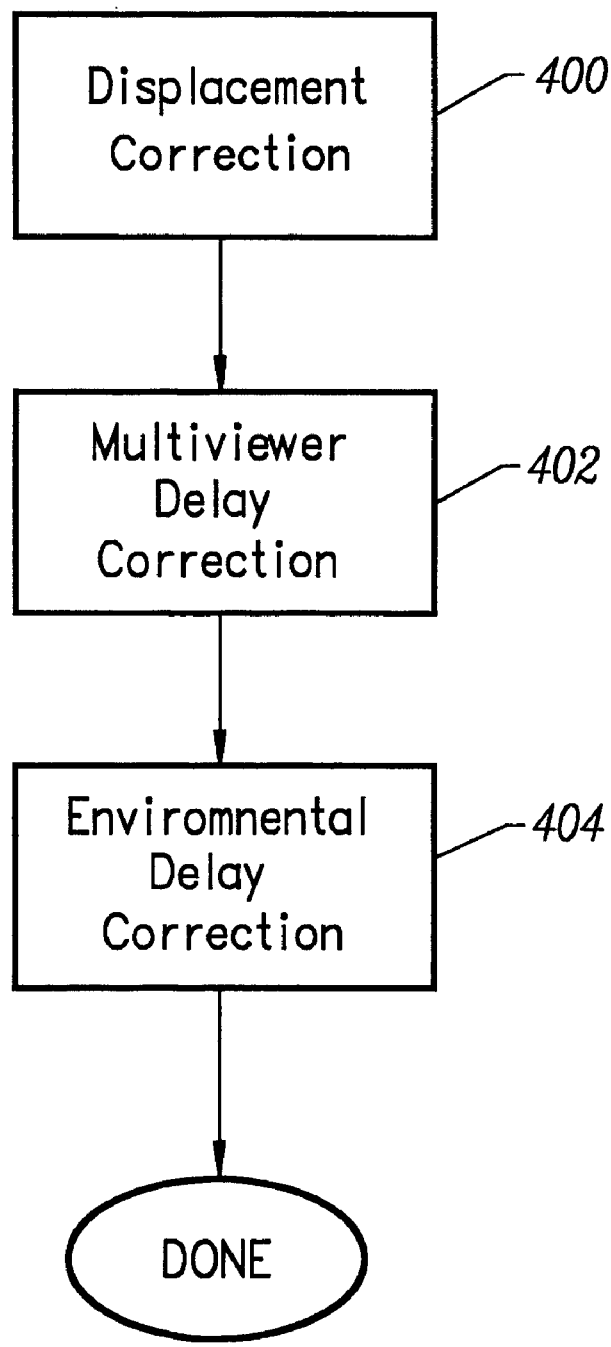
FIG. 7 is a flow chart describing the step of calibrating a tally detector.

FIG. 7 is a flow chart describing the method for calibrating the tally detector (step 156 in FIG. 3). Tally detector 88 determines whether a camera is tallied to provide a broadcast image by comparing portions of the program video (the tallied video signal) to portions of video being provided by the camera. The camera under test is determined to be providing the program video if the result of the comparison meets or falls below a predetermined threshold. In one embodiment of the present invention, tally detector 88 is implemented with a computer and software stored on a processor readable storage medium (e.g. memory, disk, etc.). Alternatively, tally detector 88 can be implemented completely in hardware.

Multiviewer 90 provides to tally detector 88 a video output that enables a single display screen to simultaneously display all of the images being input to multiviewer 90. In alternate embodiments of the present invention, the tally detector 88 is configured to receive multiple independent video inputs, thereby eliminating the need for the multiviewer 90. Tally detector 88 can also be coupled to receive the closure switch signals (CS1, CS2, and CS3) of the cameras 60, 62, 64 undergoing tally detection.

In order to ensure that accurate image comparisons are made during the operation of tally detector 88, tally detector 88 is calibrated to minimize misalignments between images that are being compared. As shown in FIG. 7, a displacement correction is performed in step 400 to reduce the horizontal and vertical misalignment caused by multiviewer 90 and other components of the system shown in FIG. 2. Next, a multiviewer delay correction is performed in step 402 to minimize the delay misalignment caused by multiviewer 90 and other components in the system shown in FIG. 2. Once these misalignments are addressed, an environmental delay correction is performed in step 404 to reduce the delay misalignment caused by environmental factors, such as varying delays caused by production equipment.

Figure 8:
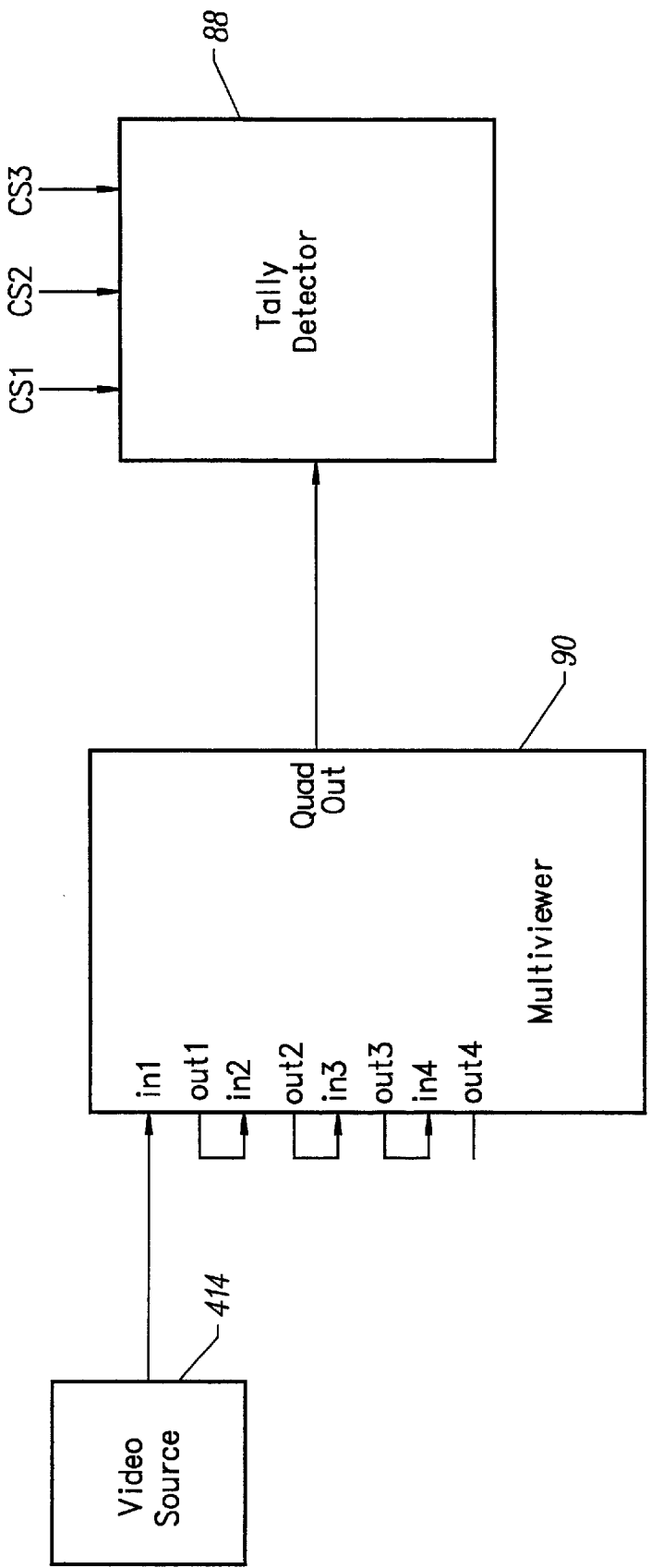
FIG. 8 depicts a wiring configuration for a multiviewer, used during the calibration of the tally detector.

When performing the displacement correction 400 and multiviewer delay correction 402, multiviewer 90 is configured as shown in FIG. 8. A first input of multiviewer 90 is configured to receive a video input from a video source 414. In one embodiment of the present invention, the video source 414 can be a videotape player or a computer. The first video output of multiviewer 90, which carries the video provided to the first input, is coupled to a second input to multiviewer 90. A second video output, which carries the video provided to the second video input, is coupled to a third video input on multiviewer 90. A third video output, which carries the video provided to the third video input, is provided to a fourth input of multiviewer 90. As a result of this set-up, the video provided by the video source 414 is displayed in the four quadrants of the tally detector's display.

Figure 9:
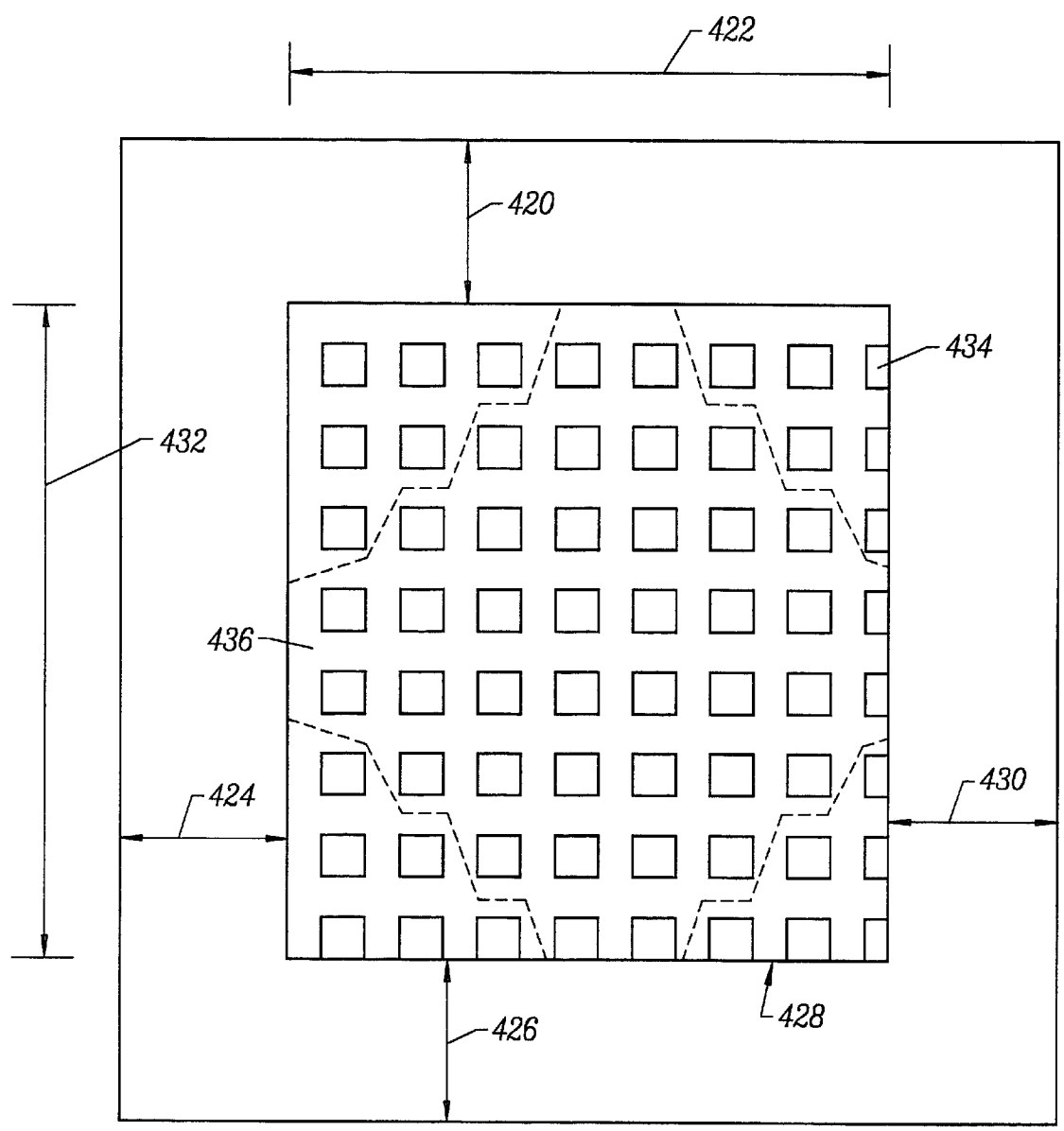
FIG. 9 depicts parameters for an image that is being operated on by the tally detector.

In order to perform the calibration, a set of parameters is defined for each video view that is displayed by tally detector 88. FIG. 9 illustrates these parameters, which include atop margin 420, right margin 430, bottom margin 426, left margin 424, height 432, and width 422. Also defined is a sample size for samples 434 that appear within the view, wherein each sample 434 is made up of a set of adjacent pixels. The margins 420, 430, 426, and 424 define a test region 428 for the image view within which video comparisons are performed. The height 432 determines the number of samples 434 that are to extend from the top margin 420 to the bottom margin 426. The width 422 determines the number of samples 434 that are to extend from the left margin 424 to the right margin 430. Given the height 432 and width 422, tally detector 88 spaces the samples 434 evenly between the margins 420, 424, 426, and 430. In one embodiment of the present invention, each of the margins 420, 424, 426, 430 is defined as being 32 pixels; each of the samples 434 is defined as being a set of 16 pixels configured in a square with 4 pixels on each side; the height 432 is defined to be 12 samples; and the width 422 is defined to be 16 samples.

Once the above-described image parameters are set, tally detector 88 completes the parameter definition by selecting a set 436 of samples 434 in the test region 428 that will be employed when performing delay comparisons. In one embodiment of the present invention, the selected set 436 of samples 428 form a diamond that extends outward from the center of the test region 428 to the margin 420, 424, 426, 430 boundaries. In alternate embodiments of the present invention, the selected set 436 of samples 434 can form a different shape or no particular shape at all. The selected set 436 of samples shown in FIG. 9 are the samples within the dotted line in the test region 428.

During the calibration set-up, additional variables can also be set, such as the baud rate of the incoming image data and an identifier indicating the format of the video data that is being received.

Once multiviewer 90 is configured and the parameters are set, the calibration process, as shown in FIG. 7, can commence. In performing the displacement correction 400, the operator determines whether the video from the second, third, and fourth video inputs of multiviewer 90 are vertically and horizontally aligned with the video provided from the first video input on multiviewer 90. Video source 414 provides a static image without any changing pixels to the first video input on multiviewer 90, so that the displacement correction 400 can be made.

Figure 10:
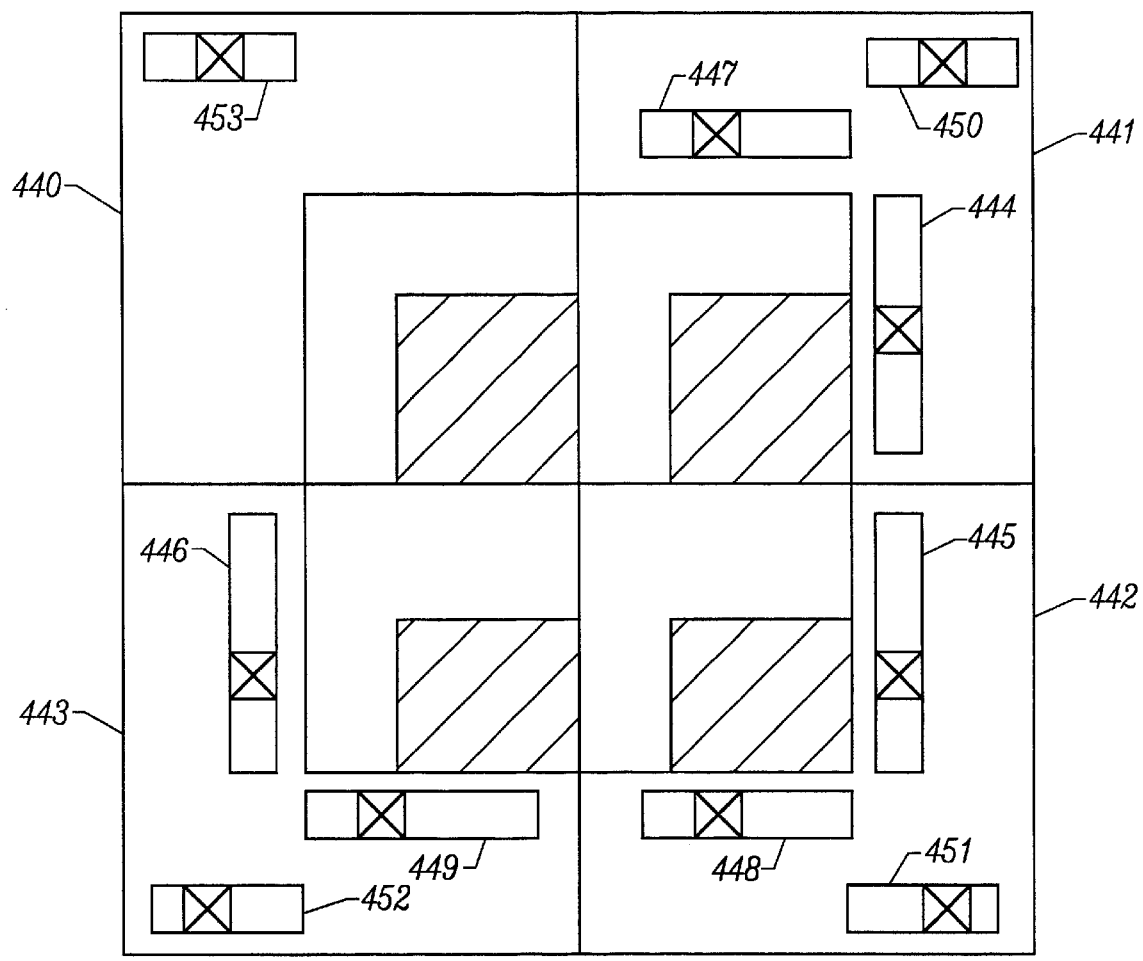
FIG. 10 depicts a graphical user interface used by the tally detector during displacement calibration.

FIG. 10 depicts the GUI provided by tally detector 88. In FIG. 8, the GUI is displaying a static image provided by video source 414 in the four quadrants. The video in the upper left hand quadrant 440 is the video received at the first video input of multiviewer 90; the video in the upper right hand quadrant 441 is the video received at the second video input of multiviewer 90; the video in the lower right hand quadrant 442 is the video received at the third video input of multiviewer 90; and the video in the lower left hand quadrant 443 is the video received at the fourth video input of multiviewer 90. In alternate embodiments of the present invention, video inputs on multiviewer 90 can be routed to different tally detector 88 display quadrants than set forth above.

As can be seen in FIG. 10, the images are not all vertically and horizontally aligned. This is illustrated by the bottom portions of the static video being truncated at the bottom of the displays in the lower quadrants 442 and 443. During displacement correction 400, tally detector 88 clearly illustrates the horizontal and vertical misalignments by determining the difference between pixel values for pixels in the test region of the first quadrant 440 and pixel values for corresponding pixels in the other quadrants 441, 442, and 442. Each difference is then written to the respective pixel location in the appropriate (441, 442 or 443) quadrant. As a result, pixels that have values matching a corresponding pixel in the upper left hand quadrant 440 are set to a predetermined color, such as black. When a quadrant video is vertically and horizontally aligned with the video in the upper left hand quadrant 440, all the corresponding pixels in the quadrant image will be set to the predetermined color.

During the displacement correction 400 (FIG. 7), the vertical and horizontal alignment of each image with respect to the video in quadrant 440 can be adjusted. In the embodiment shown in FIG. 10, this adjustment is achieved by moving the vertical displacement sliders 444, 445, and 446 and horizontal displacement sliders 447, 448, and 449 positioned along the horizontal and vertical axes of each quadrant 441, 442, and 443 on the tally detector's GUI. Once an adjustment is made, another set of differences can be determined and written to see if the vertical and horizontal alignment is acceptable. In an alternate embodiment of the present invention, tally detector 88 evaluates the result of the pixel value differences to determine whether a sufficient number of the pixels are properly aligned. In yet another embodiment of the present invention, tally detector 88 self adjusts the horizontal and vertical alignments.

Figure 11:
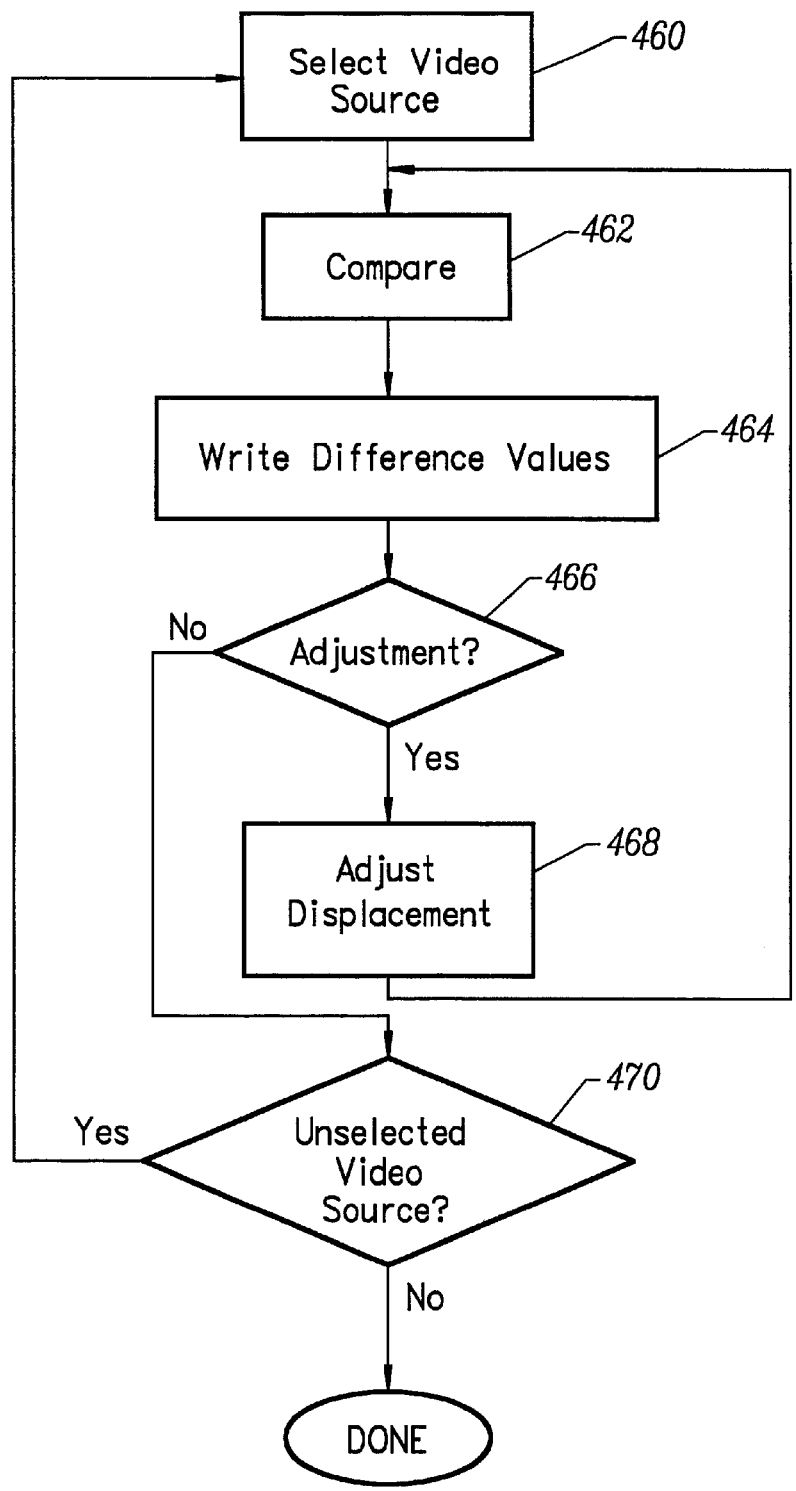
FIG. 11 is a flow chart describing the method of correcting displacement.

FIG. 11 illustrates a sequence of operations that are performed to carry out the displacement correction shown in FIG. 7. First, a video for comparison is selected in step 460 from one of quadrants 441, 442, and 443 on tally detector 88. Next test region 428 of the video in quadrant 440 is compared to the selected quadrant video to determine pixel value differences in step 462. After the comparison in step 462, the pixel value differences are written to corresponding pixels in the selected quadrant 441, 442, or 443 in step 464.

In one embodiment of the present invention, pixel value differences are determined for each pair of pixels because the video image is being presented in a 4:2:2 YCbCr format.

In such a format every two horizontally adjacent pixels are defined by one set of Cb and Cr characteristics and each pixel has a Y characteristic. The Y characteristic defines the luminance for a pixel, and the Cb and Cr characteristics combine to define the pixel color. The Y characteristic can have a value in a range of 16 to 180. The Cb and Cr characteristics can each have a value in a range of 16 to 240. A pixel is black when Y equals 16 and Cb and Cr each equal 180. In such an embodiment, the pixel value differences are determined in step 462 according to the following equations:

$$Y1PD=(Y1P-Y1C)$$

$$Y2PD=(Y2P-Y2C)$$

$$CrPD=(CrP-CrC)$$

$$CbPD=(CbP-CrC)$$

wherein:
  Y1PD is the Y pixel difference value for a first pixel;
  Y2PD is the Y pixel difference value for a second pixel;
  CrPD is the Cr pixel difference value;
  CbPD is the Cb pixel difference value;
  Y1P is the Y value for the first pixel in the pixel pair from the quadrant 440 video;
  Y1C is the Y value for the first pixel in the pixel pair from the selected quadrant video;
  Y2P is the Y value for the second pixel in the pixel pair from the quadrant 440 program video;
  Y2C is the Y value for the second pixel in the pixel pair from the selected quadrant video;
  CrP is the Cr value for the pixel pair from the quadrant 440 video;
  CrC is the Cr value for the pixel pair from the selected quadrant video;
  CbP is the Cb value for the pixel pair from the quadrant 440 video; and
  CbC is the Cb value for the pixel pair from the selected quadrant video.

Next, a determination of whether a suitable displacement adjustment has been reached is made in step 466 (FIG. 11). An adjustment is suitable if difference values are less than a selected threshold. One example of a typical threshold is 10,000. In one embodiment of the present invention, such a determination is made by a user making a visual evaluation of whether a sufficient number of pixels in the selected quadrant image are black. In an alternate embodiment of the present invention, tally detector 88 evaluates each of the pixel differences to ensure that a sufficient number of them are less than a predetermined maximum value. Such a maximum value may be the pixel value that results in a pixel being black. Alternatively, such a maximum value may be the threshold mentioned above.

If it is determined that a suitable adjustment has not been rendered in step 466, then a horizontal, vertical, or horizontal and vertical adjustment is made in step 468. The adjustment results in tally detector 88 recording that each pixel in the quadrant 440 video corresponds to a pixel in the selected quadrant video that is offset from the quadrant 440 pixel by an adjustment number of pixels in either the horizontal, vertical, or both horizontal and vertical directions. After the adjustment offset is set in step 468, the pixel value difference comparison in step 462 is repeated, as described above.

The adjustment offset, in one embodiment of the present invention, is set by a user manipulating the horizontal and vertical sliders 447–448 and 444–446 described above with respect to FIG. 10. In an alternate embodiment of the present invention, the adjustment offset can be determined by tally detector 88 performing an iterative process in which it supplies different adjustment offsets until it is determined that the displacement adjustment is suitable in step 466.

If it is determined that the displacement adjustment is suitable in step 466 for the selected quadrant video, then it is determined whether any of the quadrant videos to be compared have not yet been selected in step 470. If it is determined that any of the videos have not yet been selected, then a new video is selected in step 460 and the process in FIG. 11 is repeated for the newly selected video, as described above. If it is determined that there are no unselected quadrant videos in step 470, then the displacement correction (step 400, FIG. 7) is completed.

Figure 12:
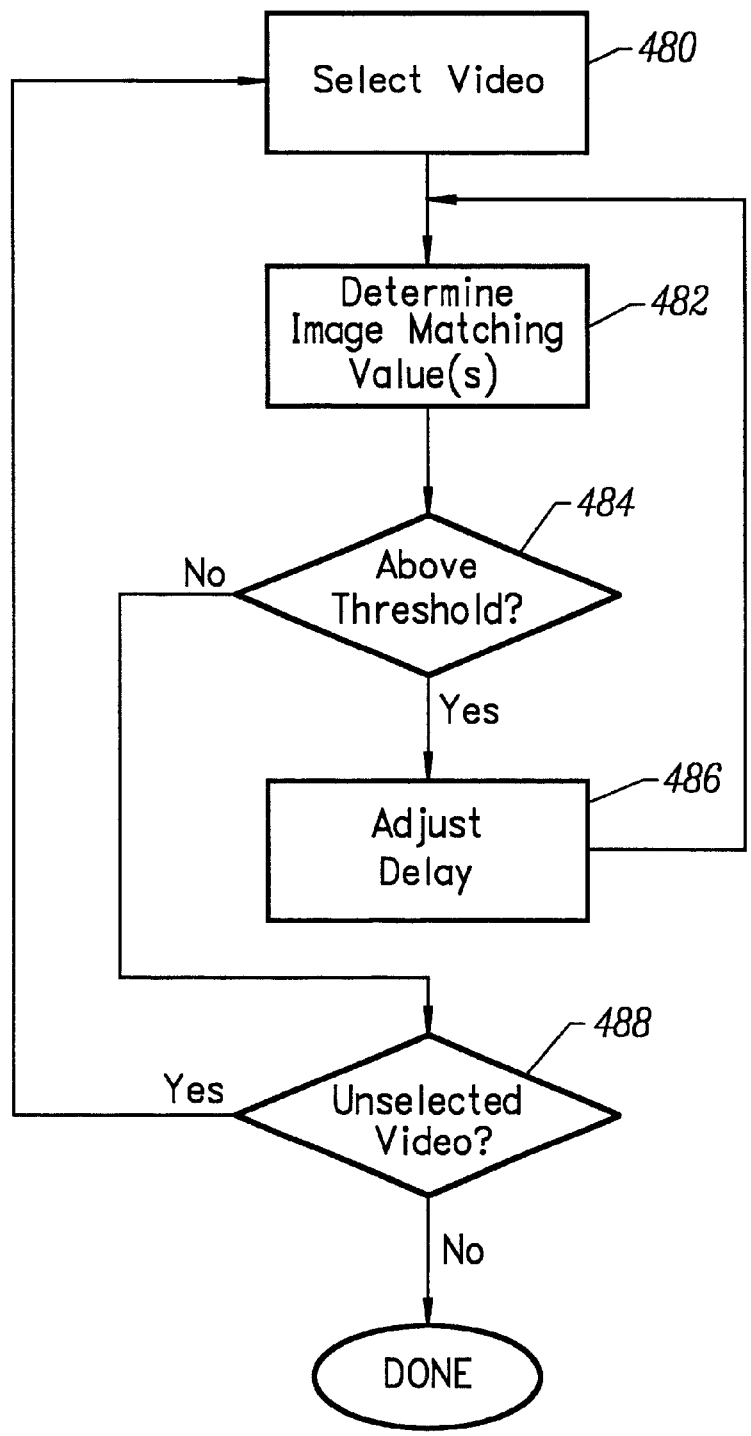
FIG. 12 is a flow chart describing the method of correcting for delay.

As shown in FIG. 7, the displacement correction 400 is followed by the multiviewer delay correction step 402. Prior to performing the multiviewer delay correction 402, the video source 414 (FIG. 8) is adjusted to begin providing a moving image to multiviewer 90. FIG. 12 illustrates a sequence of operations for performing the multiviewer delay correction 402. First, a quadrant 441, 442, or 443 video is selected in step 480 to be compared with the quadrant 440 video. Next, an image matching value or set of values is determined in step 482. The image matching value indicates the magnitude of the delay misalignment between a frame in the quadrant 440 video and a frame in the selected quadrant video. An explanation of the image matching value is found below in the discussion with respect to FIG. 13.

The image matching value (or values) is then compared using a threshold in step 484. The threshold is a maximum allowable image difference value. In one embodiment of the present invention, the threshold determination 484 is made by a user comparing a displayed image matching value on the tally detector 88 GUI with the threshold image difference value. In such an embodiment, multiple image matching values can be determined by tally detector 88 for successive incoming video frames prior to a threshold determination 484 being made. The values would be displayed to a user who can decide whether the threshold is met. In an alternate embodiment, tally detector 88 makes the threshold comparison. A range of suitable thresholds is from 10,000 to 20,000. One exemplar method of computing a suitable threshold is to calculate 32 multiplied by the number of pixels employed in determining the image matching value (discussed below).

If it is determined that the image matching value is above the threshold in step 484, then the delay alignment between the quadrant 440 video and selected quadrant video is adjusted in step 486. Once the delay adjustment is made, a new image matching value is determined in step 482. In one embodiment of the present invention, an adjustment in the delay causes tally detector 88 to either increase or decrease the delay of the selected quadrant video. Such an adjustment is made in one embodiment of the present invention by adjusting one or more of the delay sliders 450, 451, 452 or 453 for the selected quadrant image on tally detector 88 GUI. Sliders 450, 451 and 452 adjust the delays for the videos in quadrants 441, 442 and 443. Delay slider 453 adjusts the delay for the program video. The program video can be delayed one or two frames. Delay slide 453 permits simultaneous adjustments of the three cameras and avoids negative delays for the cameras. In an alternate embodiment of the present invention, the adjustment can be made by tally detector 88 automatically.

Once the image matching value is determined to be equal to or less than the threshold (image difference value) in step 484, it is determined whether any of the quadrant 441, 442, and 443 videos have not yet been selected in step 488. If any of the quadrant 441, 442, 443 videos have not yet been selected, then a new quadrant video is selected in step 480. If all the quadrant videos have been selected, then the multiviewer delay correction is complete.

Figure 13:
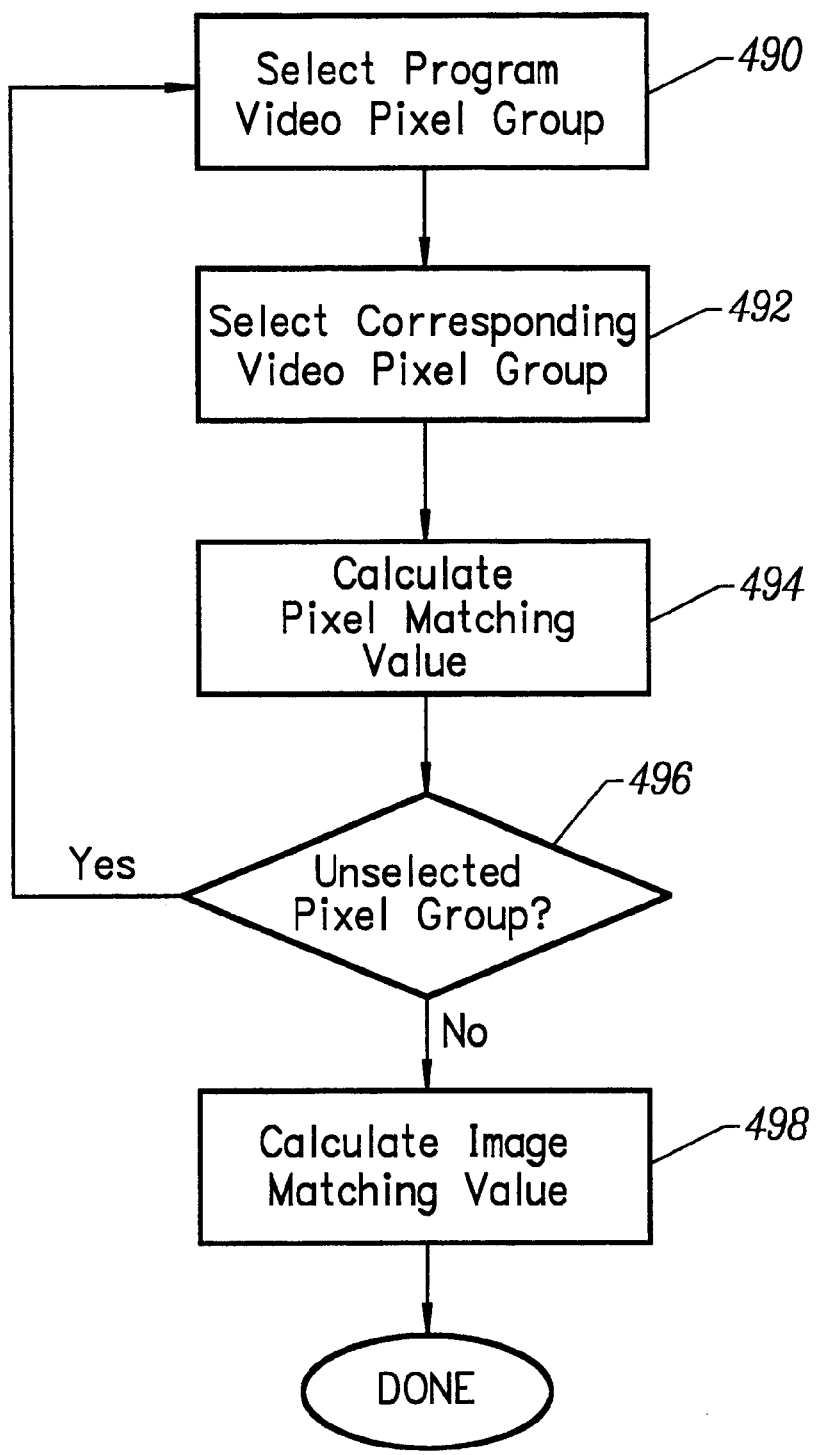
FIG. 13 is a flow chart describing the method of determining an image matching value.

FIG. 13 illustrates a sequence of operations for determining an image matching value (step 482 of FIG. 12) in accordance with the present invention. First, a group of pixels in the quadrant 440 video is selected in step 490. Next, a group of corresponding pixels in the selected quadrant 441, 442, or 443 video are selected in step 492. In one embodiment of the present invention using 4:2:2 YCbCr format, selecting groups of pixels for both the first quadrant 440 video and selected quadrant video in one embodiment of the present invention includes selecting a pair of pixels for each video.

Once the pixel groups have been selected, a pixel matching value is determined in step 494. The pixel matching value is determined by calculating the difference between pixel group characteristics for the quadrant 440 video pixel group and the selected quadrant video pixel group. In one embodiment of the present invention, the pixel matching value is calculated according to the following equation:

$$PM=|(Y1P-Y1C+Y2P-Y1P)*LW+(CrP-CrC+CbP-CbC)*CW|$$

wherein:
PM is the pixel matching value;
Y1P is the Y value for a first pixel in the quadrant 440 video group of pixels;
Y1C is a Y value for a first pixel in the selected quadrant video pixel group;
Y2P is a Y value for a second pixel in the quadrant 440 video pixel group;
Y2C is a Y value for a second pixel in the selected quadrant video pixel group;
LW is a luminance weighting value, which can be set during the calibration set-up;
CrP is a Cr value for the quadrant 440 video pixel group;
CrC is a Cr value for the selected quadrant video pixel group;
CbP is a Cb value for the quadrant 440 video pixel group;
CbC is a Cb value for the selected quadrant video pixel group; and
CW is a color weighting value, which can be set during the calibration set-up.

In one embodiment of the present invention, LW is set to equal 1, and CW is set to equal 2. LW and CW can be set to equalize the effective differences observed in luma and chroma for a test video input.

Once the pixel matching value is determined in step 494, it is determined in step 496 whether any other pixel groups are to be evaluated. In one embodiment of the present invention, all of the pixel groups that are included within samples 434 (FIG. 9) in the quadrant 440 image test region 428 (FIG. 9) are used to calculate pixel matching values. If it is determined that more pixel matching values are to be calculated for pixel groups, then new pixel groups are selected in steps 490 and 492 and a new pixel matching value is determined in step 494, as described above.

If it is determined that no more pixel groups are to be evaluated in step 496, then an image matching value is calculated in step 498, based on the pixel matching values. In one embodiment of the present invention, the image matching value is calculated according to the following equation:

$$IM=(IMP*(TC-1)/TC)+(\Sigma PM/TC)$$

wherein:
IM is the image matching value;
IMP is the last calculated image matching value for the selected quadrant image;
TC is a time constant, which can be set during the calibration set-up;
$\Sigma PM$ is a summation of a set of the pixel matching values calculated in step 494.

The use of the time constant and prior image matching value causes the image matching value to be the output of a single pole infinite impulse response filter. This reduces the effect of brief, for example, one frame changes, in one of the video streams. Such change may occur from noise or signal processing in multiviewer 90. In one embodiment of the present invention the time constant is set to be equal to 8 frame samples.

The set of pixel matching values that are selected to be summed ($\Sigma PM$) in determining the image matching value, in one embodiment of the present invention, are pixel matching values that are calculated for pixel groups that fall within the selected set 436 of samples in the test region 428, as described above with reference to FIG. 9. The selected set 436 of samples is employed, because most of the activity and change in the image will typically take place in this region and because titles and other graphics typically do not occur in that region. In further embodiments of the present invention, pixel matching values for pixels in addition to those pixels in the selected set 436 of samples can be employed to determine the image matching value.

Figure 14:
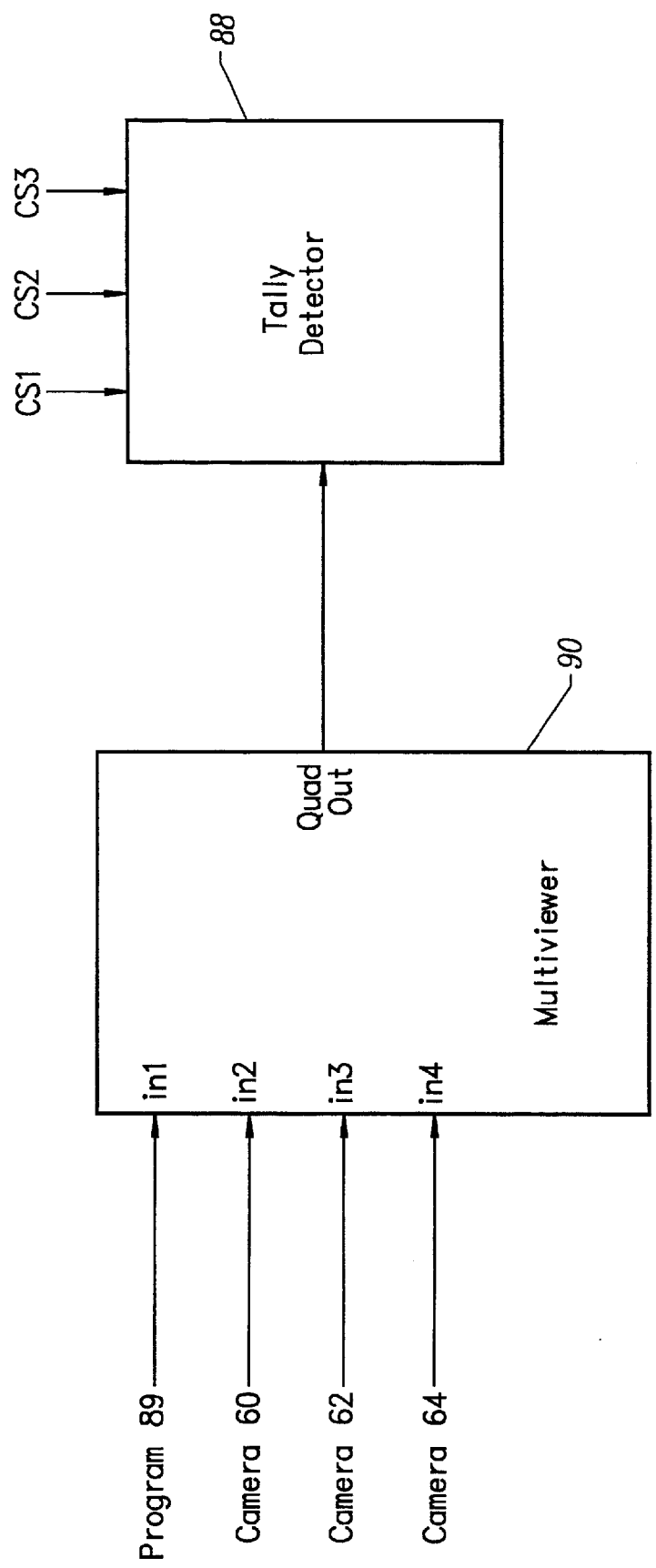
FIG. 14 depicts a wiring diagram for a multiviewer, used during environmental delay correction of the tally detector.

FIG. 7 shows displacement correction 400 followed by multiviewer delay correction 402. In alternate embodiments, displacement correction 400 and multiviewer delay correction 402 do not follow in sequential order. In such embodiments, displacement correction 400 and multiviewer delay correction 402 can be performed simultaneously. In further embodiments of the present invention, the displacement correction is performed and then the multiviewer delay correction 402 and environmental delay correction 404 are simultaneously performed. In this embodiment, the configuration of FIG. 14 is used.

Once displacement correction 400 and multiviewer delay correction 402 are complete, environmental delay correction 404 (FIG. 7) is performed. During environmental delay correction 404 and during normal operation, multiviewer 90 is configured as shown in FIG. 14. The video inputs of multiviewer 90 are configured to receive a program video 89 and video outputs from the set of cameras 60, 62, and 64 that are to undergo tally detection.

The first video input of multiviewer 90 is coupled to receive program signal 89, the video to be broadcast. The second video input of multiviewer 90 receives the output of camera 60; the third video input of multiviewer 90 receives the output of camera 62; and the fourth video input of multiviewer 90 receives the output of camera 64. The multiviewer's quad output, as described above, provides a video output to tally detector 88 that provides for simultaneously displaying all of the videos being received by multiviewer 90 on tally detector 88 display. As a result, the upper left hand quadrant 440 of the tally detector 88 display will show program video 89; the upper right hand quadrant 441 will show the video from camera 60; the lower right hand quadrant 442 will show the video from camera 62; and the lower left hand quadrant 443 will show the video from camera 64. In alternate embodiments of the present invention, the program signal 89 and camera 60, 62, and 64 video outputs are coupled to different multiviewer 90 inputs than described above. As a result, the video from program signal 89 can appear in a different quadrant than 440.

Once multiviewer 90 is configured, the environmental delay correction step 404 corrects delay alignments that exist between the program video and the videos from each of cameras 60, 62, and 64. Such delays are typically introduced by environmental factors such as frame synchronization.

Figure 15:
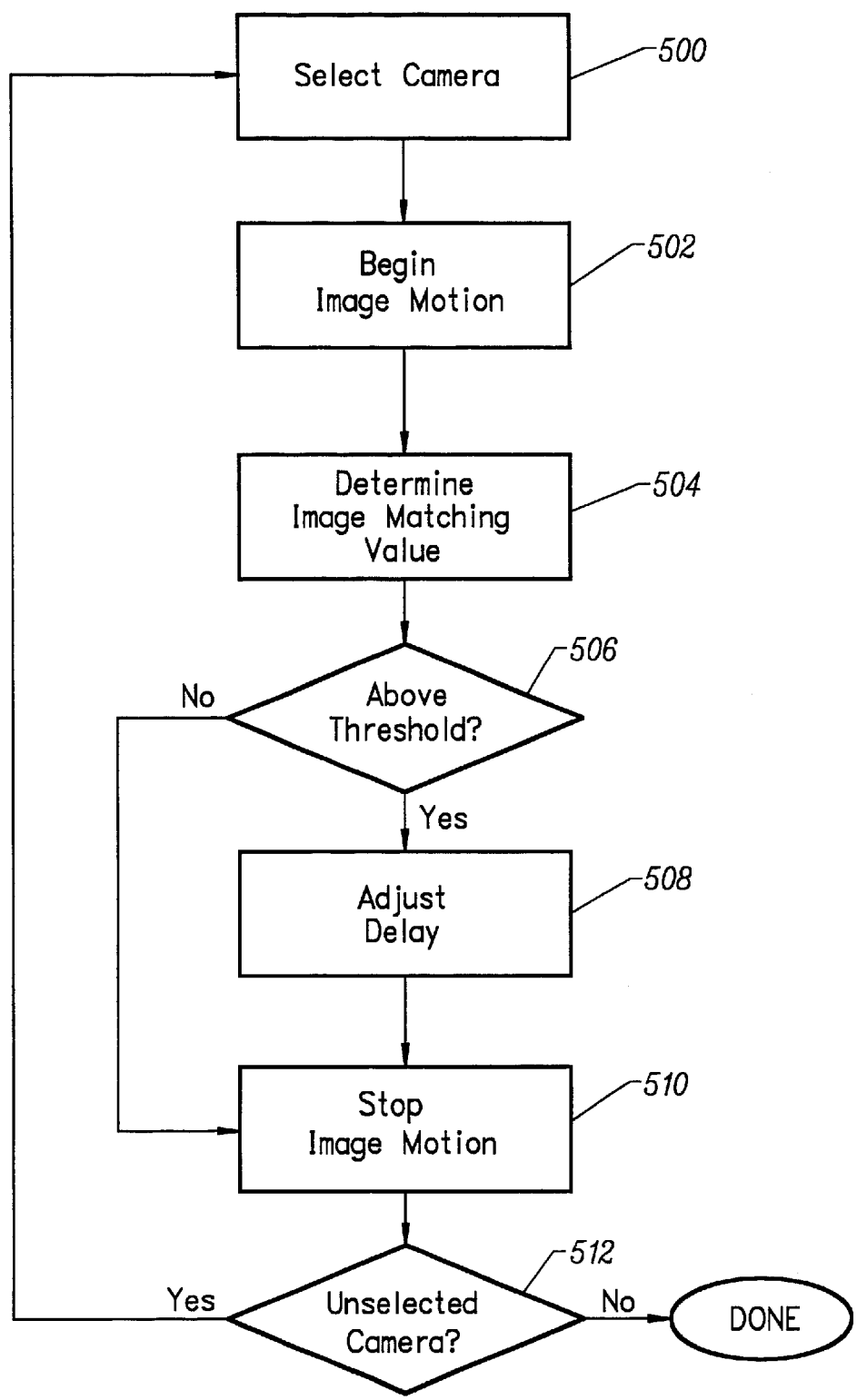
FIG. 15 is a flow chart describing the method of correcting for environmental delay.

FIG. 15 illustrates a sequence of operations performed in the environmental delay correction 404 in one embodiment of the present invention. First, a camera 60, 62, or 64 is selected in step 500. In selecting the camera, the camera is tallied so that its output is provided as program signal 89. The selected camera is then operated so that it provides rapidly changing video images in step 502. This can be achieved by continuously panning and tilting the selected camera. While the rapidly changing video images are being provided, an image matching value is determined in step 504 between the program image and the selected camera image. The image matching value is calculated as described above with respect to the image matching value determination step 482 (FIG. 12) in the multiviewer delay correction (step 402 in FIG. 7).

After an image matching value is determined, it is determined in step 506 whether the image matching value is within a desired threshold, such as being equal to or less than a maximum possible value (e.g. use the threshold example described above or determine a new one based on trial and error). If it is determined that the image matching value is above a desired threshold, then the delay alignment between the camera image and program image can be adjusted by adjusting the camera image delay in step 508. After the delay is adjusted, a new image matching value is calculated in step 504. The threshold comparison 506 and delay adjustment 508 can be performed as described above with respect to the threshold determination step 484 and adjustment step 486 (FIG. 12) in the multiviewer delay correction (step 402 in FIG. 7).

Once it is determined in step 506 that the image matching value is not above a delay threshold, the selected camera stops providing rapidly changing video images in step 510. After the rapidly changing video images are no longer provided, it is determined whether any of the cameras 60, 62, and 64 have not yet been selected in step 512. If it is determined that any of the cameras 60, 62, and 64 have not been selected, then one of the unselected cameras is selected in step 500 and the environmental delay correction 404 is continued as described above with respect to FIG. 15. If it is determined that all the cameras 60, 62, and 64 have been selected, then the environmental delay correction 404 is done. In alternate embodiments of the present invention, the environmental delay correction 404 is only performed for a single camera. This is done when it is believed that the delay for each of the cameras with respect to the program image is the same.

In one embodiment of the present invention, the multiviewer displacement correction 400 is performed using the same configuration as for environmental delay correction 404. In such an embodiment, the program signal 89 provides a static video frame instead of rapidly changing video. In such an embodiment, the multiviewer delay correction 402 is not performed, since it is achieved by doing the environmental delay correction 404.

Looking back at FIG. 3, step 154 includes the establishment of inclusions and exclusions. In one embodiment, the creation of an inclusion comprises the identification of luminance and/or colors for pixels that can be modified (inclusions) and the creation of an exclusion comprises the identification of luminance and/or colors for pixels that are not to be modified (exclusions). In a further embodiment, the creation of an exclusion includes the identification of pixel locations that are not to be modified (exclusions).

The establishment of inclusions and exclusions in embodiments of the present invention provides for making fine distinctions between luminance and color values that are very close, where it is critical to modify pixels with one luminance-color combination and not modify pixels with another combination. Such circumstances arise during the rendering of a first down line, as described above, when the appearance of a player's uniform is very similar to the field. For example, an inclusion may describe the green color of grass while an exclusion might describe a different shade of green used on a player's uniform. A traditional chroma key system lacks the ability to make such distinctions, since it merely provides for replacing a predetermined color.

When operating the system of FIG. 2 to provide a first down line, step 154 includes having an output from a camera being sent to main computer 94. The camera will be panned and tilted to point to the different areas of the stadium. The operator can view the output of the camera on a monitor and using a pointing device (e.g. a mouse), select areas for inclusion (create an inclusion filter) or exclusion (create a exclusion filter). For example, the operator could choose the shady grass, sunny grass, chalk and dirt for inclusions. The operator may choose the players' uniforms, shoes, football and referees as exclusions.

Figure 16:
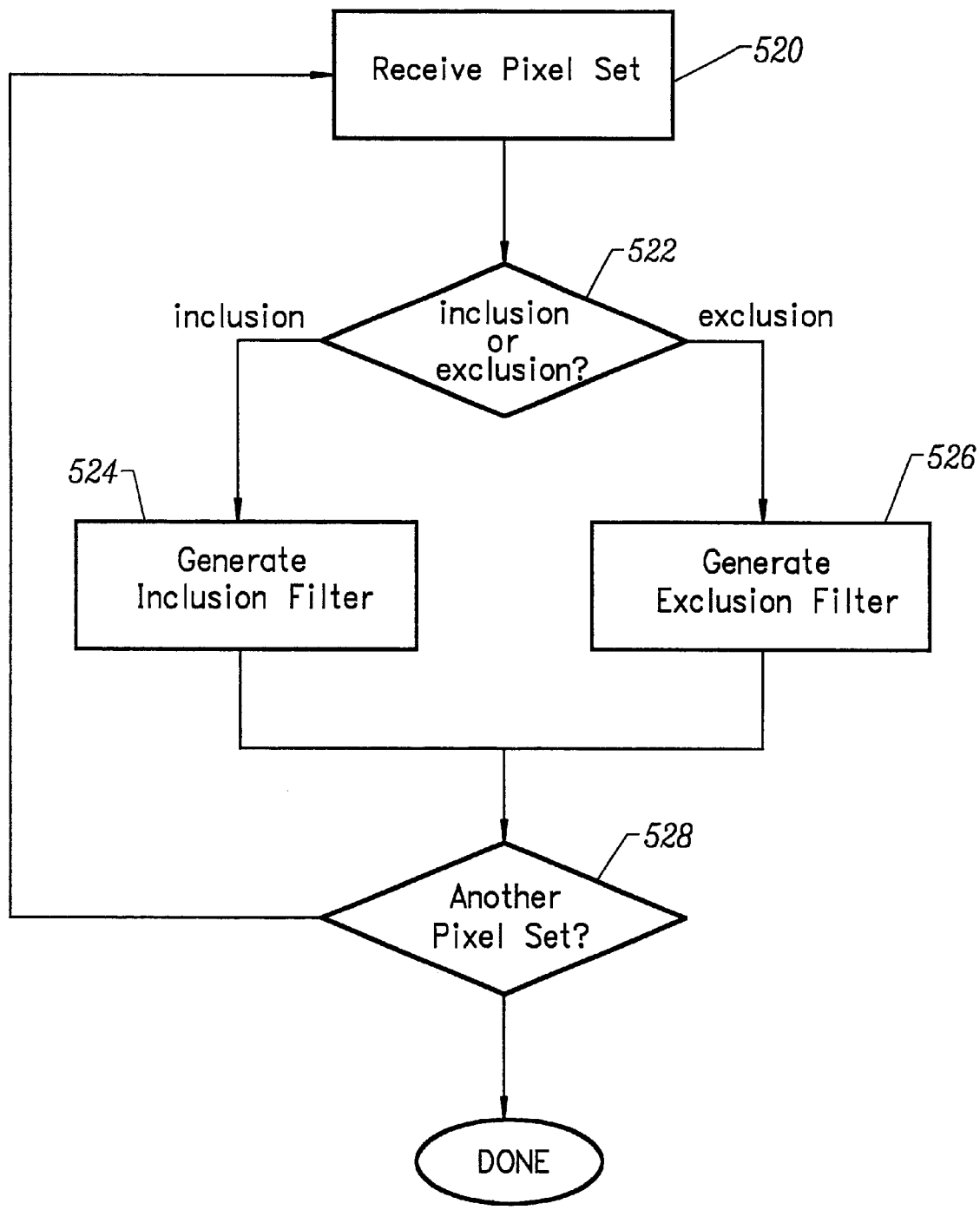
FIG. 16 is a flow chart describing one embodiment of the step of establishing inclusions and/or exclusions.

FIG. 16 illustrates a sequence of operations that are performed to establish a set of luminance and color criteria for use in determining inclusions and exclusions, in one embodiment of the present invention. The process of FIG. 16 can be repeated for each set of criteria. First, main computer 94 receives a set of pixels in step 520. In one embodiment of the present invention, the pixel set received is from the output of one of the cameras 60, 62 or 64. For example, when the system is employed for displaying a first down line (or other type of marker) on a football game, a pixel set can include selected pixels from an image of the playing field, selected pixels from an image of one of the teams' uniforms, or other images. In another embodiment, the pixel set can be received from a stored image.

Once the pixel set is received, the operator of main computer 94 determines whether the pixel set is to be used for identifying exclusion pixels or identifying inclusion pixels in step 522. An exclusion pixel is a pixel in the captured video that is not to be modified. An inclusion pixel is a pixel in the captured video that can be modified to blend with a graphic (as long as it is not also an exclusion pixel). For example, when the graphic is a first down marker in a football game, a exclusion pixel in the broadcast program image might be a pixel having the luminance-color combination of one of the teams' uniforms. An inclusion pixel in such an example, might be a pixel in the broadcast program image that has the luminance-color combination of the grass on the playing field.

If it is determined in step 522 that the pixel set has been received for establishing criteria for exclusion pixels (also called exclusion criteria), then main computer 94 generates an exclusion filter (step 526). If it is determined in step 522 that the pixel set has been received to establish criteria for inclusion pixels (also called inclusion criteria), then main computer 94 generates an inclusion filter (step 524). An exclusion filter defines an exclusion by providing criteria that can be employed to determine whether a pixel is an exclusion pixel. An inclusion filter defines an inclusion by providing criteria that can be employed in determining whether a pixel is an inclusion pixel. In one embodiment, if a pixel passes both an inclusion filter and an exclusion filter, the pixel will be treated as part of an exclusion.

After generating either an inclusion filter in step 524 or an exclusion filter in step 526, a determination of whether another pixel set is to be received is made in step 528. If another pixel set is to be received, then the new pixel set is received in step 520 and the above-described process is repeated. Otherwise, the process for establishing luminance and color criteria is done. As can be seen, multiple inclusion filters and exclusion filters can be generated.

The process of FIG. 16 can be performed at various times throughout the operation of the system of FIG. 2. This may be necessary, for example, when a first down marker is to be shown on a playing field that is made up of all green grass prior to the start of a football game. During the football game, areas of the grass may become torn up, thereby exposing brown dirt that was not present before the game. The first down marker will need to be drawn over the dirt appearing on the playing surface. Accordingly, the luminance-color criteria process in FIG. 16 will be reinitiated, so an inclusion filter can be generated for the dirt. Other factors that can necessitate a reinitiation of the process of FIG. 16 include, but are not limited to, sunsets, moving clouds, changes in zoom and changes in camera color correction controls.

Figure 17:
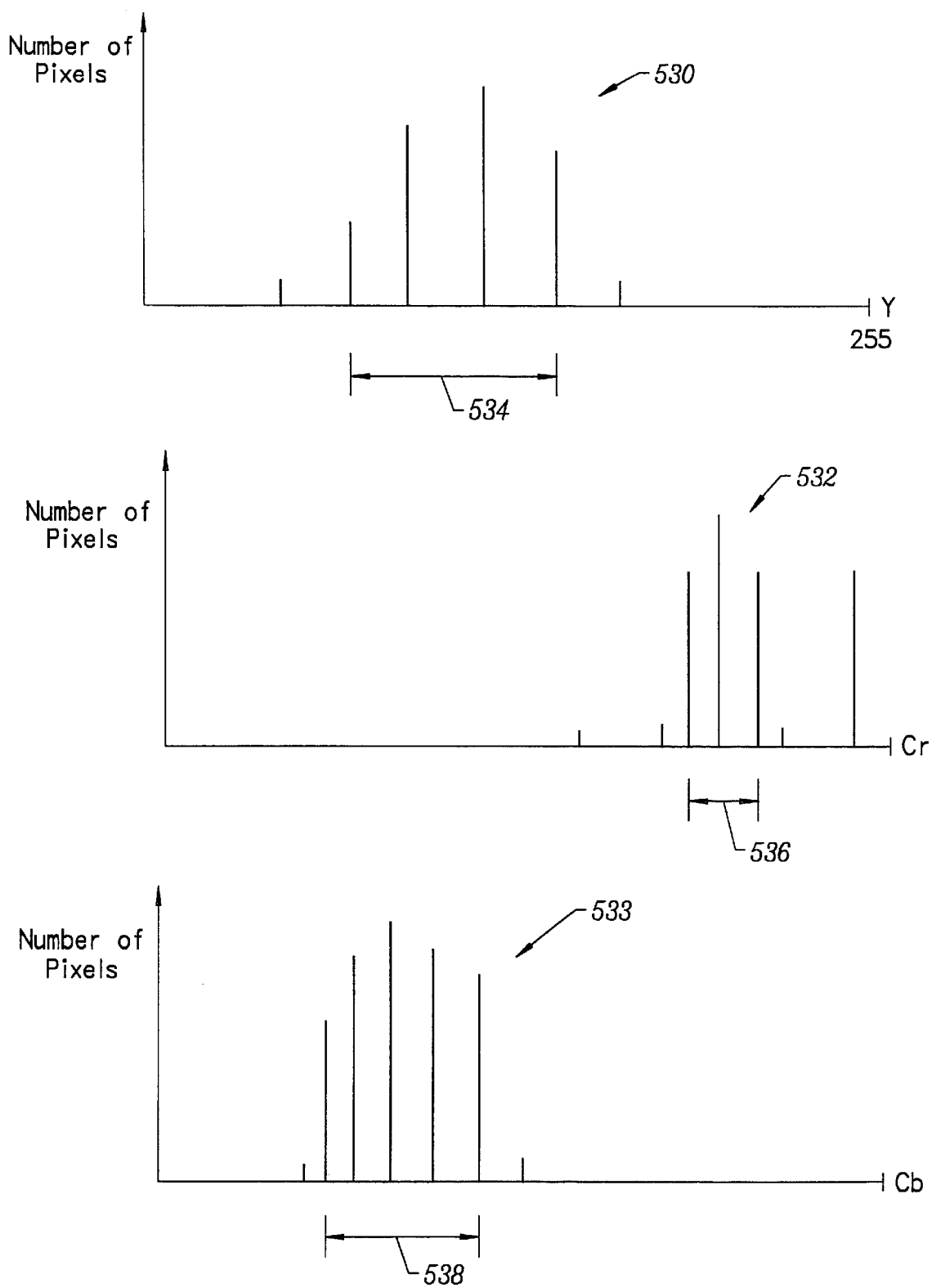
FIG. 17 depicts inclusion filter histograms.

In one embodiment of the present invention, main computer 94 generates inclusion filters and exclusion filters by generating a set of histograms characterizing the received sets of pixels. FIG. 17 shows a set of histograms 530, 532, and 533 that have been created for an inclusion filter in one embodiment of the present invention. In such an embodiment, the pixels have pixel characteristic sets that conform to a YCbCr format, as described above. The filter includes a histogram for each of the YCbCr characteristics.

The Y characteristic histogram 530 has a horizontal axis representing luminance values and a vertical axis representing the number of pixels in the received pixel set that corresponds to each of the luminance values. The Cr characteristic histogram 532 has a horizontal axis representing Cr values and a vertical axis representing the number of pixels in the received pixel set that corresponds to each of the Cr values. The Cb characteristic histogram 533 has a horizontal axis representing Cb values and a vertical axis representing the number of pixels in the received pixel set that corresponds to each of the Cb values. Each histogram 530, 532, and 533 has a respective pass band 534, 536, and 538 that defines the Y, Cr, or Cb characteristics that a pixel must have to be an inclusion pixel. Accordingly, a pixel will be designated as an inclusion pixel when the filter shown in FIG. 17 is applied and the pixel has a Y characteristic value within pass band 534, a Cr characteristic value within pass band 536, and a Cb characteristic value within pass band 538.

Figure 18:
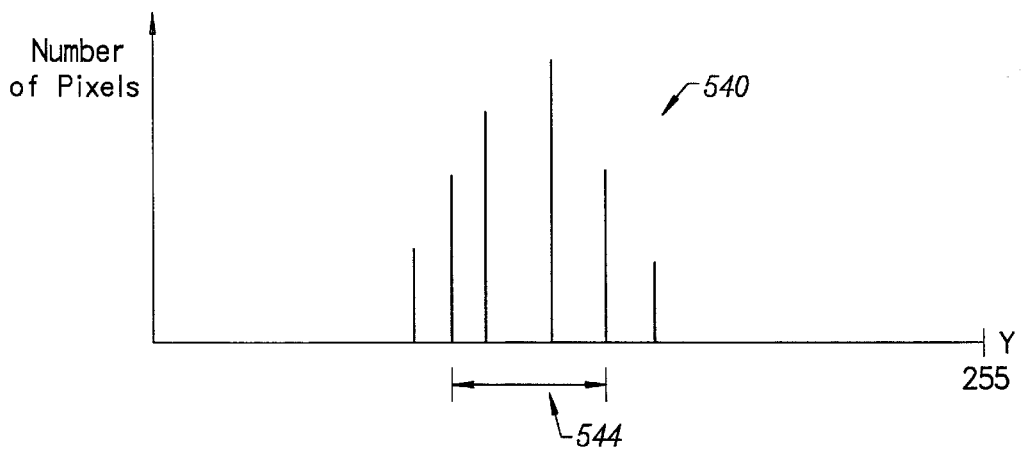
FIG. 18 depicts exclusion filter histograms.
Figure 18:
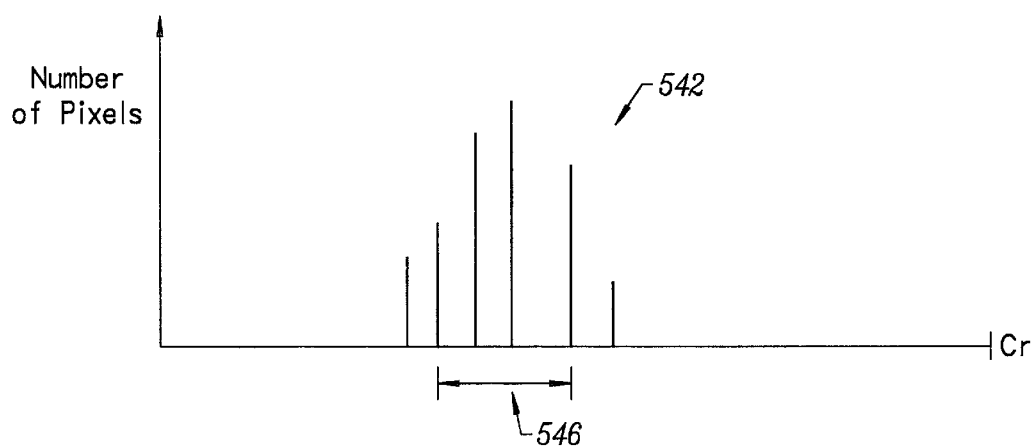
Figure 18:
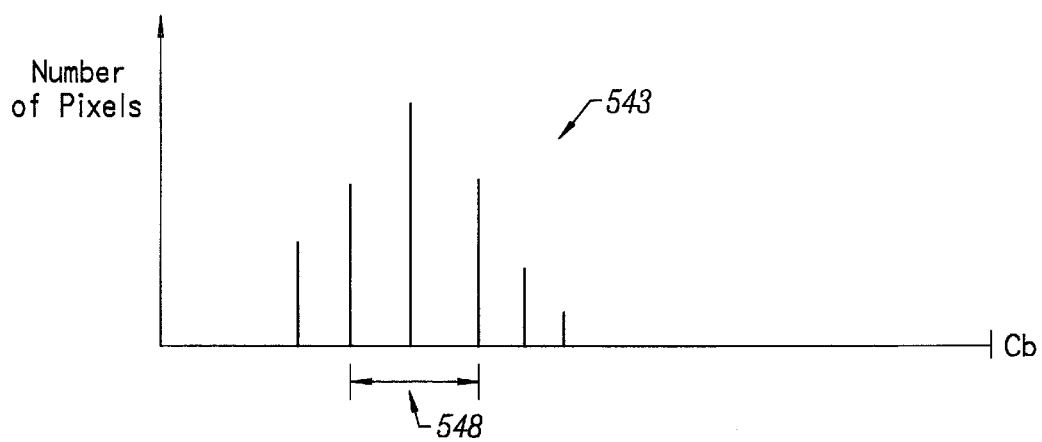

FIG. 18 shows a set of histograms 540, 542, 543 that have been created for an exclusion filter in one embodiment of the present invention, based on a received pixel set conforming to the YCbCr pixel characteristic set format. The filter includes a histogram 540, 542, and 543 for each of the YCbCr characteristics.

The Y characteristic histogram 540 has a horizontal axis representing luminance values and a vertical axis representing the number of pixels in the received pixel set that corresponds to each of the luminance values. The Cr characteristic histogram 542 has a horizontal axis representing Cr values and a vertical axis representing the number of pixels in the received pixel set that corresponds to each of the Cr values. The Cb characteristic histogram 543 has a horizontal axis representing Cb values and a vertical axis representing the number of pixels in the received pixel set that corresponds to each of the Cb values. Each histogram 540, 542, and 543 has a respective pass band 544, 546, and 548 that defines the Y, Cr, or Cb characteristic value that a pixel must have to be an exclusion pixel. Accordingly, a pixel will be designated as an exclusion pixel when the filter shown in FIG. 18 is applied and the pixel has a Y characteristic value within pass band 544, a Cr characteristic value within pass band 546, and a Cb characteristic value within pass band 548.

Figure 19:
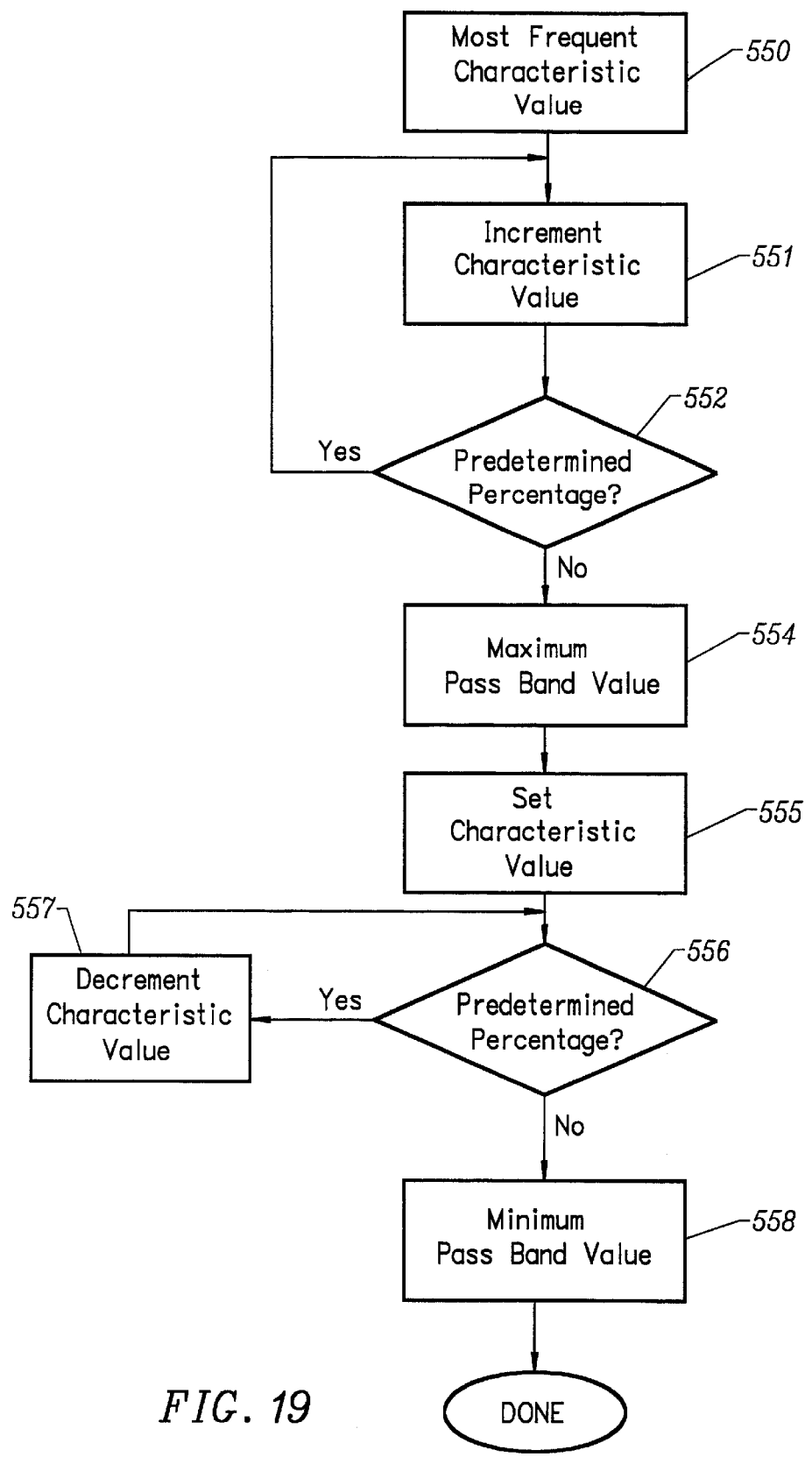
FIG. 19 is a flow chart describing the setting of a filter pass band.

FIG. 19 illustrates a sequence of operation performed by main computer 94 to determine a pass band for an inclusion filter histogram or an exclusion filter histogram. In the embodiment using YCbCr, the steps of FIG. 19 are performed for each of the three histograms. First, main computer 94 identifies the most frequently occurring value for the characteristic (Y, Cr, or Cb) represented by the histogram in step 550. Next, the characteristic value is incremented in step 551. It is then determined whether the number of pixels having the resulting characteristic value is within a predetermined percentage of the number of pixels having the most frequently occurring characteristic value in step 552. In one embodiment of the present invention, the predetermined percentage employed in step 552 is 10 percent for an inclusion filter and 50 percent for an exclusion filter.

If it is determined that the number of pixels with the characteristic value is within the predetermined percentage, then the characteristic value is incremented in step 551 and a new comparison is performed. If it is determined that the number of pixels with the characteristic value is not within the predetermined percentage, then the maximum characteristic value for the pass band is set in step 554. In step 554, the maximum pass band value is set to equal the last characteristic value that was determined to be represented by a number of pixels within the predetermined percentage of the number of pixels representing the most frequently occurring characteristic value.

Once the maximum pass band characteristic value is set, the characteristic value is set to be equal to the characteristic value just below the most frequently occurring characteristic value in step 555. It is then determined whether the number of pixels having the resulting characteristic value is within a predetermined percentage of the number of pixels having the most frequently occurring characteristic value in step 556. In one embodiment of the present invention, the predetermined percentage employed in step 556 is 1 percent for an inclusion filter and 25 percent for an exclusion filter. In another embodiment of the present invention, the predetermined percentage employed in step 556 is 10 percent for an inclusion filter and 50 percent for an exclusion filter.

If it is determined that the number of pixels with the characteristic value is within the predetermined percentage, then the characteristic value is decremented in step 557 and a new comparison is performed. If it is determined that the number of pixels with the characteristic value is not within the predetermined percentage, then the minimum characteristic value for the pass band is set in step 558. In step 558, the minimum pass band value is set to equal the last characteristic value that was determined to be represented by a number of pixels within the predetermined percentage of the number of pixels representing the most frequently occurring characteristic value.

Although the generation of an inclusion filter and exclusion filter has been described with respect to forming a histogram, one of ordinary skill in the art will recognize that it is not necessary to actually form a graphical image of a histogram. Main computer 94 could also maintain a table of data that reflects the Y, Cr, and Cb pixel occurrences for a set of pixel values and derive the same filter. It will also be recognized that 1 percent and 25 percent (and 10% and 50%) are not the only percentages that may be employed. Any number of percentages may be employed, depending upon the resolution that is desirable for the filter. One with ordinary skill in the art will further recognize that other methods can be employed for generating inclusion filters and exclusion filters. For example, a color region or set of color regions can be selected for inclusion or exclusion using a chromacity diagram.

Figure 20:
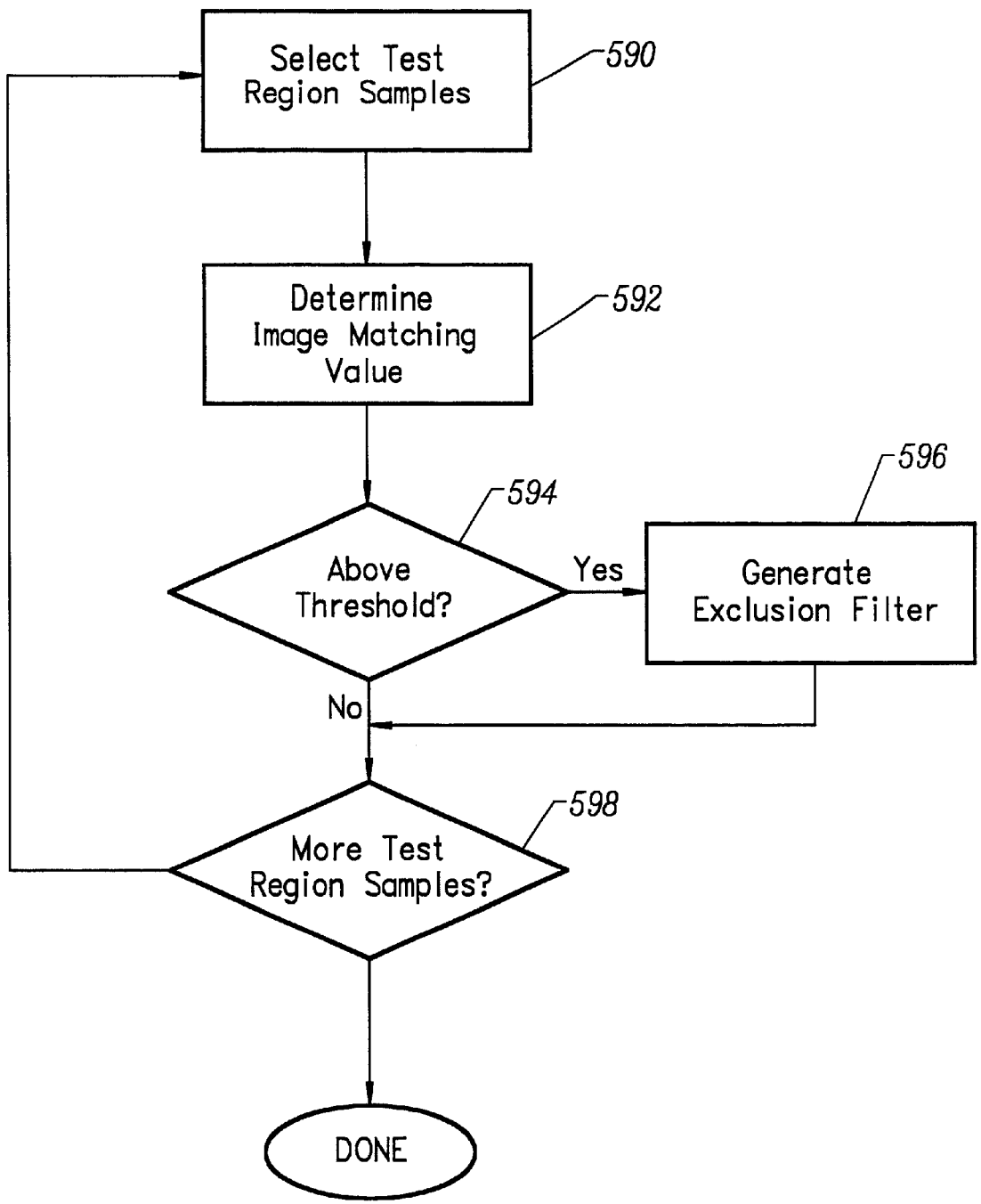
FIG. 20 is a flow chart describing an alternate embodiment of the step of establishing inclusions and/or exclusions.

FIG. 20 illustrates a sequence of operations performed by tally detector 88 for generating a different type of exclusion filter that identifies exclusions based on pixel locations. In such an embodiment, the exclusion filter identifies pixel locations in a program video that are to be excluded, instead of identifying exclusion pixel luminance-color combinations. Such an exclusion filter is useful to account for graphics added to the program video, such as game clocks, scores and other graphics.

First, a set of the samples 434 in the program video are selected in step 590. In one embodiment of the present invention, the set of the samples selected in step 590 represent pixel locations where a constant image (constant location in frame), such as a game clock, is expected to be located. For example, the constant image in one embodiment may be located in any one of the four corners of a frame of the program video. Thus, it may be advantageous to first choose samples in one corner of the frame.

Once the set of samples is selected, an image matching value is determined in step 592 between the selected samples in the program video and corresponding samples in the video directly provided by a camera supplying the program video. As described above, the image matching value indicates the degree of similarity between the selected samples in the program video and the tallied camera's video. The image matching value is then compared to a matching threshold in step 594.

If the image matching value is above the threshold, then the low degree of similarity is taken as an indication that the program video contains a constant image, such as a game clock, that is not in the tallied camera video. As a result, the pixel location in the program video that are bounded by the samples selected in step 590 are listed in an exclusion filter in step 596. After the exclusion filter is generated in step 596, a determination is made in step 598 of whether more samples in the program video are to be evaluated. If so, the system loops back to step 590 and selects new samples.

If the image matching value is not determined to be above the threshold in step 594, then the high degree of similarity is taken as an indication that the program video does not contain a constant image at the location of the samples. Next, it is determined in step 598 whether more samples in the program video are to be evaluated. Once it is determined that no more program samples are to be evaluated, the process is done.

In one embodiment of the present invention, the above described process is repeated, until the relevant boundaries for all constant images in the program video are identified. It may be advantageous to select a corner of the frame in step 590. If it is determined that the corner includes a constant image, the entire corner can be used to define an exclusion. Smaller samples can be used in future iterations of the method of FIG. 20 to find the exact position of the image.

After processing on one corner (or other region) is exhausted, subsequent iterations of the method of FIG. 20 will operate on other corners or regions.

In one embodiment, the exclusion filter contains pixel locations that identify the boundaries of the constant image. For example, the exclusion filter can indicate that all pixel locations to the left of (or to the right of, or below, above, etc.) a particular line of pixel locations are not to be modified.

Figure 21:
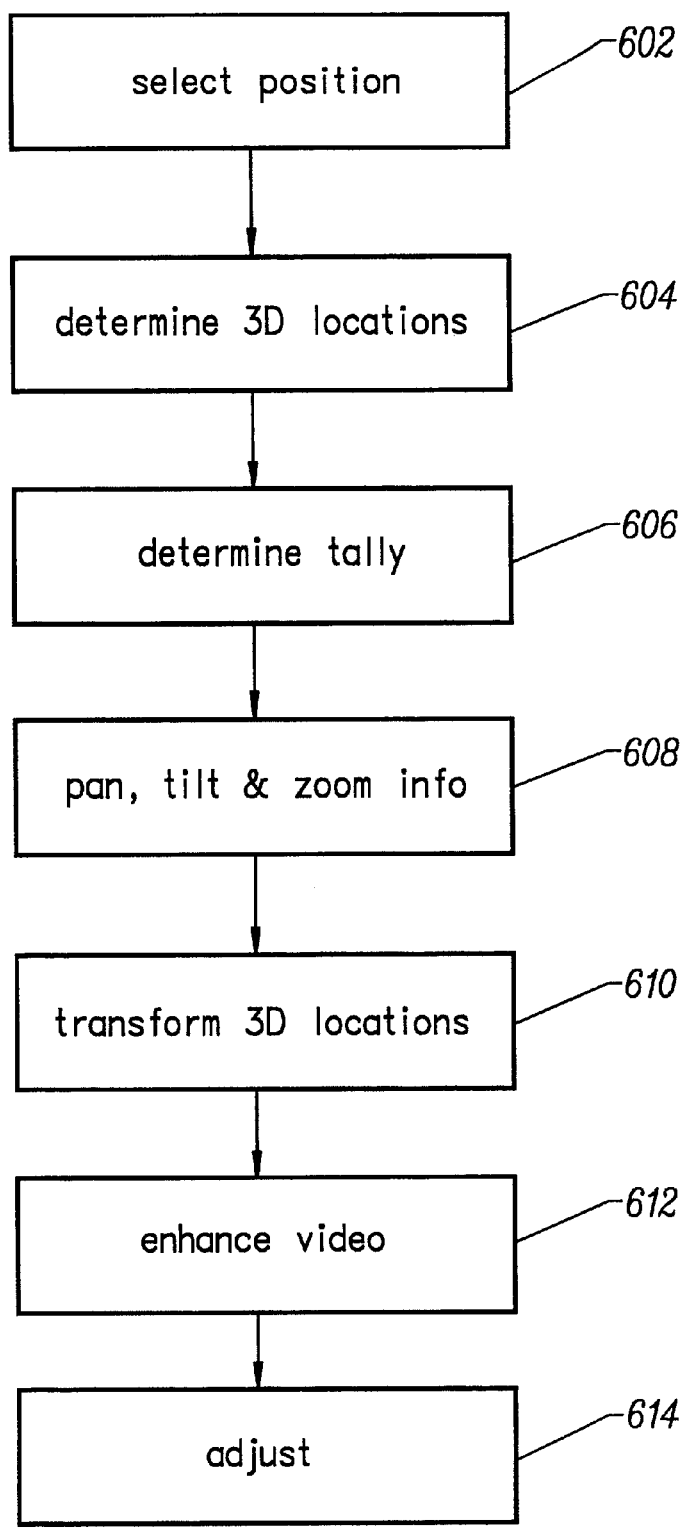
FIG. 21 is a flow chart describing the method of operation of the embodiment depicted in FIG. 2.

FIG. 21 is a flow chart describing the operation (step 158 of FIG. 3) of the system during a live event. In step 602, a position in the environment is selected for placement of the graphic. If the graphic is a yard line representing the first down, an operator can select the location to add the yardline using a pointer or keyboard. For example, the operator can type in a yard line number such as "27.3." If the graphic is a logo, advertisement or other graphic, the operator can point to or type in the location of one or more vertices of a rectangle bounding the logo. Any logo can be represented as a rectangle by filling portions of the rectangle with a clear image, as necessary. In one alternative, the position of the graphic could be entered automatically from a sensor system, other computer, etc. In step 604, computer 94 uses the model created in step 150 to determine the three-dimensional coordinates of the position selected in step 602. In step 606, tally detector 88 determines which camera is tallied. In step 608, main computer 94 receives camera view data (pan, tilt and/or zoom or other information) from the various local computers 72, 74 and 76. Main computer 94 will make use of the camera view data for the tallied camera.

In step 610, computer 94 transforms the three-dimensional locations (determined in step 604) to a set of two-dimensional positions in the frame of video from the tallied camera. The step of transforming could be accomplished by using any suitable means for converting a location in the three-dimensional real space to the corresponding two-dimensional point within the camera's view. One exemplar suitable means is using transformation matrices. Other means known in the art can also be used. The terms "transform" and "converting" are not limited to the use of transformation matrices.

A point in three-dimensional space is represented by a 4 element row vector: (x, y, z, 1.0). The 1.0 (sometimes called w) allows for translation. In camera space, the point (0,0,0, 1.0) is at the origin. A camera is represented mathematically by a 4×4 matrix (K) which includes details of position and orientation. The three-dimensional point is transformed into a two-dimensional normalized frame position by multiplying the point by the camera matrix (K). The camera matrix (K) is a combination of rotation, translation, and perspective elements, all of which are represented by 4×4 matrices. In reality, the motion of the camera point of view (POV) is much more complicated with offsets caused by the kinematics of the tripod head and the motion of the optical POV along the camera's optical axis due to lens characteristics. All these effects can be modeled as more complex linkages (additional matrices) between the fixed camera base and the resulting POV of the camera as the camera is moved through its range of motion. These techniques are well-known in the art.

In the disclosed embodiment, cameras 60, 62 and 64 are each modeled as a 4×4 matrix which includes two parts—a fixed transformation (X) which represents the position of the camera in the stadium and its orientation, and a variable transformation (V) which varies with changes in pan angle, tilt angle and the zoom:

$$K = XV$$

The fixed transformation matrix (X) models x, y, z position as well as fixed yaw, pitch and roll representing the camera's mount orientation:

$$X = TYPR$$

where, $$T = \begin{bmatrix} 1 & 0 & 0 & 0 \\ 0 & 1 & 0 & 0 \\ 0 & 0 & 1 & 0 \\ -x & -y & -z & 1 \end{bmatrix}$$

$$Y = \begin{bmatrix} \cos yaw & -\sin yaw & 0 & 0 \\ \sin yaw & \cos yaw & 0 & 0 \\ 0 & 0 & 1 & 0 \\ 0 & 0 & 0 & 1 \end{bmatrix}$$

$$P = \begin{bmatrix} 1 & 0 & 0 & 0 \\ 0 & \cos pitch & -\sin pitch & 0 \\ 0 & \sin pitch & \cos pitch & 0 \\ 0 & 0 & 0 & 1 \end{bmatrix}$$

$$R = \begin{bmatrix} \cos roll & 0 & \sin roll & 0 \\ 0 & 1 & 0 & 0 \\ -\sin roll & 0 & \cos roll & 0 \\ 0 & 0 & 0 & 1 \end{bmatrix}$$

The parameters of the matrices T, Y, P & R are determined during registration. The x, y and z variables from matrix (T) are the x, y and z coordinates determined in step 310. The yaw variable of matrix (Y) is the pan parameter determined in step 310. The pitch variable in matrix (P) is the tilt parameter determined in step 304. The roll variable of matrix (R) is the twist parameter determined in step 312.

For a camera used with a Vinton Vector 70 camera head and a Canon J55 Super lens, the variable transformation is modeled in four parts (matrices):

$$V = ADFG$$

$$A = \begin{bmatrix} \cos pan & -\sin pan & 0 & 0 \\ \sin pan & \cos pan & 0 & 0 \\ 0 & 0 & 1 & 0 \\ 0 & 0 & 0 & 1 \end{bmatrix}$$

$$D = \begin{bmatrix} 1 & 0 & 0 & 0 \\ 0 & \cos tilt & -\sin tilt & 0 \\ 0 & \sin tilt & \cos tilt & 0 \\ 0 & 0 & 0 & 1 \end{bmatrix}$$

$$F = \begin{bmatrix} 1 & 0 & 0 & 0 \\ 0 & 1 & 0 & 0 \\ 0 & 0 & 1 & 0 \\ 0 & -povdist & 0 & 1 \end{bmatrix}$$

$$G = \begin{bmatrix} f_h & 0 & 0 & 0 \\ 0 & f_v & 0 & 0 \\ 0 & 0 & -(f+n)/(f-n) & -1 \\ 0 & 0 & -2fn/(f-n) & 0 \end{bmatrix}$$

Matrix (A) models the camera's pan on its fixed base. Matrix (D) models the camera's tilt angles are measured with the pan and tilt sensors. Matrix (F) models the lens moving fore and aft along the optical axis of the lens as a function of the zoom. The variable povdist (or First Principal Point, or Front Nodal Point) is the camera's virtual point of view measured as a distance forward of the tilt axis when the camera is in the horizontal position. This information can be measured on an optical bench and a lookup table built as a function of zoom position, focus, and 2X Extender setting. The information for the lookup table is measured by placing two targets in the view of the camera, off-center, one farther away than the other, so they appear in line through the viewfinder. Where a line extended through those targets intersects the optical axis of the camera is the position of the virtual point of view. Matrix (G) models the effective focal length of the lens as a function of zoom, focus, and 2X Extender settings. The variables n and f are the distances to the mathematical near and far clipping planes; which are only important in assigning a useful range for z-buffered graphics drawing; therefore, nominal values are used of n=1 meter and f=100 meters. The variable $f_h$ is the effective horizontal focal length of the lens. The variable $f_v$ is the effective vertical focal length of the lens. The aspect ratio, which is constant, is $f_h/f_v$. A software routine is used to convert the appropriate zoom factor and aspect ratio to $f_h$ and $f_v$.

After using the transformation matrices, the system takes into account lens distortion. That is, each two-dimensional pixel position is evaluated in order to determine if the two-dimensional position should change due to lens distortion. For a given two-dimensional pixel position, the magnitude of a radius from the optical center to the two-dimensional pixel position is determined. Lens distortion is accounted for by moving the pixel's position along that radius by an amount ΔR:

$$\Delta R = K(R)^2$$

where
  R=pixel distance from optical center to two-dimensional position
  K=distortion factor.

At a fixed focus, the distortion factor is measured at a number of zoom values using a GUI slider to align the model to the video. These values are used to generate a distortion curve. During operation, the distortion factor at the current zoom is interpolated from the curve and applied to all transformed two-dimensional pixel positions points. The distortion data can also be obtained from the lens manufacturer or can measured by someone skilled in the art.

After the system transforms the coordinates of the three-dimensional location representing the place in the environment where the graphic is to be added to a two-dimensional position in the frame of video, the system enhances the video accordingly in step 612. Because the system uses the model in conjunction with camera view data, there is no need to use pattern recognition to find images in the video. The steps of enhancing the video includes blending the graphic with the video. In one embodiment, step 612 includes keying the graphic over the video. In other embodiments, step 612 could include the step of a computer editing the actual video to add the graphic, replacing a portion of the video with the graphic, adding a highlight at or near the graphic, etc. In one alternative, the system also accounts for occlusions. A more detailed discussion of step 612 is provided below. An operator can view the enhanced video on monitor 112. If the two-dimensional position determined in step 610 is not within the frame of the tallied camera, then the system does not enhance the video in step 612.

It is possible that after the system enhances the video the operator is unhappy with the actual placement of the graphic. Therefore, PC concentrator 82 can include a GUI that will allow the operator to manually adjust the placement of the graphic in step 614. That is, the operator can use a slider or a keyboard to move the graphic or, in one alternative, the operator can drag the graphic. For example, consider the system where a first down line is being added to a video of a football field. If the video from a camera shows a marker on the side of the field that indicates the official first down location, the operator can adjust the position of the graphic of the line to exactly coincide with the official first down marker. In one embodiment, the system can use the technology described above to perform the steps in reverse and determine the numerical yard line for the first down based on the step 614 of adjusting the yard line.

Figure 22A:
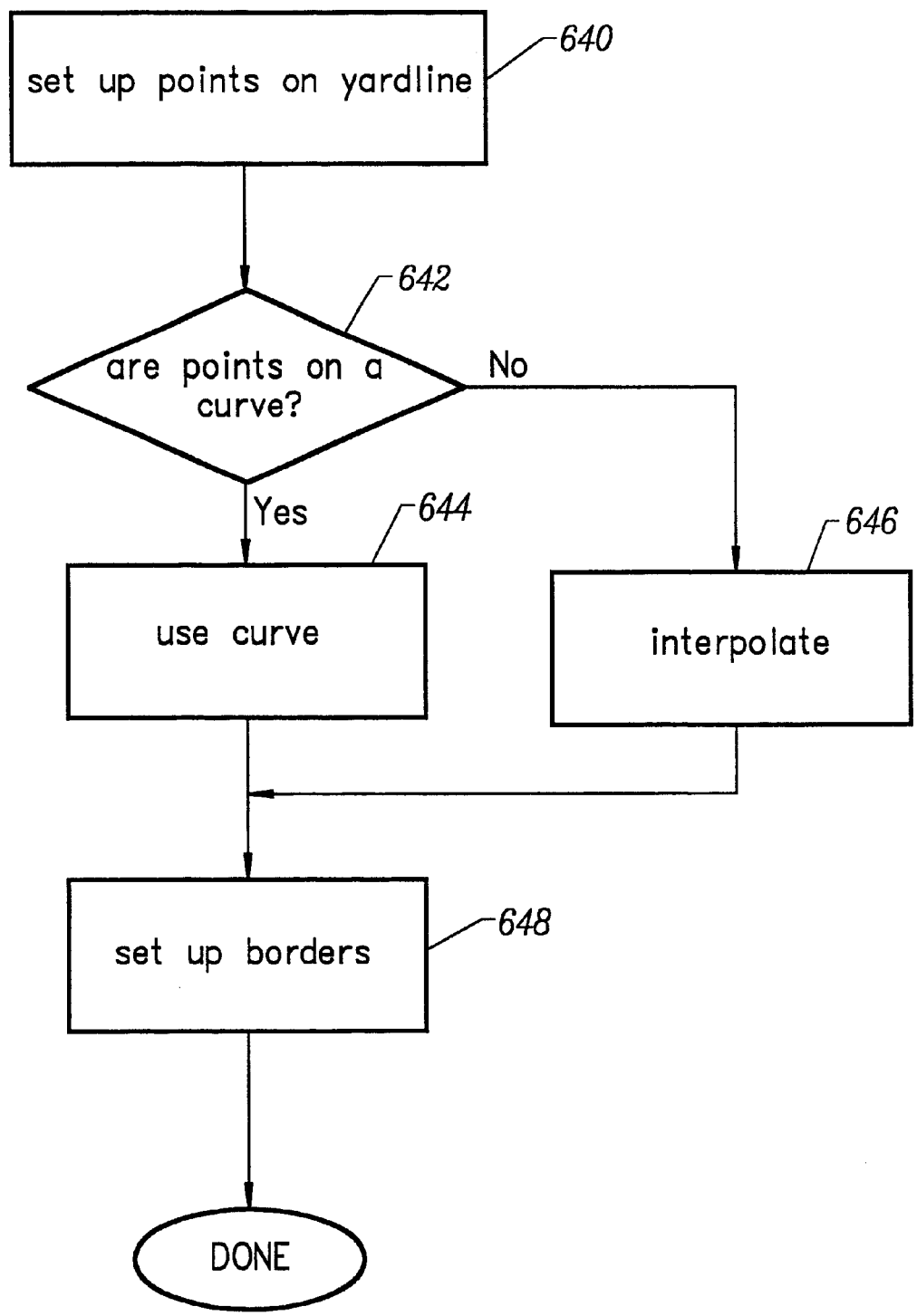
FIG. 22A is a flow chart describing one embodiment of the method of determining three-dimensional locations.

FIG. 22A describes one embodiment for the method of determining three-dimensional locations using the model (step 604 of FIG. 21). Steps of FIG. 22A are used in the case where the graphic is a yard line to be placed on an image of a football field; however, the steps can be modified or used without modification to add other graphics to a video. In step 640, computer 94 sets up a set of points on the line. Previously in step 602 of FIG. 21, a position was selected. If the graphic is a yard line, step 640 includes accessing the yard line position in the model that corresponds to the selected position. The yard line position represents the x coordinate of the yard line. Main computer 94 will represent the yard line as a number of points. In one embodiment, the yard line is represented by 151 equally spaced points with the first point at the near side line and the last point at the far side line. Thus, in step 640 main computer 94 determines the x and y coordinates for all 151 points. In step 642, main computer 94 determines whether the yard line is on a preexisting curve in the model. If it is, then in step 644, the equation for that curve is used to determine the z coordinate for each of the 151 points. If it is not on a curve, then in step 646 main computer 94 interpolates between the two nearest curves (using linear interpolation) to determine z coordinates for each of the 151 points. In one alternative, rather than interpolate between two curves, main computer 94 can create a new curve. The new curve will have a similar form to the equations discussed above. The coefficients of the equations are obtained by interpolating between the coefficients of the two nearest curves. In other embodiments, more or fewer than 151 points can be used. In one such embodiment, 101 points are employed on each border.

In step 648, main computer 94 sets up two border lines, each having 151 points. A yard line can be thought of as a line segment with no width. However, to make the yard line visible on a monitor the yard line is depicted as being one yard wide. Other widths (such as a ¼ of a yard) can also be used. In one embodiment of the present invention, the width is selected by a user of the system shown in FIG. 2, using the system's GUI. Because the yard line has a width, the system models the graphic as the space between two borders. Each border will be represented by 151 points, each point corresponding to a point on the center yard line. The x coordinate for each point on the borders will be the x coordinate of the selected portion plus or minus a half yard (or other appropriate value if the line is not one yard wide). Each point of the borders will have z and y coordinates equal to a corresponding point on the yard line.

At this point, main computer 94 has a set of 302 three-dimensional points, where 151 points represent a first border and 151 points represent a second border. Each point on the first border has a corresponding point (with the same y coordinate) on the second border. In one embodiment, these points represent the maximum boundary of the graphic to be added. In alternative embodiments, these points can represent vertices or other reference points for the graphic, rather than maximum boundaries.

Figure 22B:
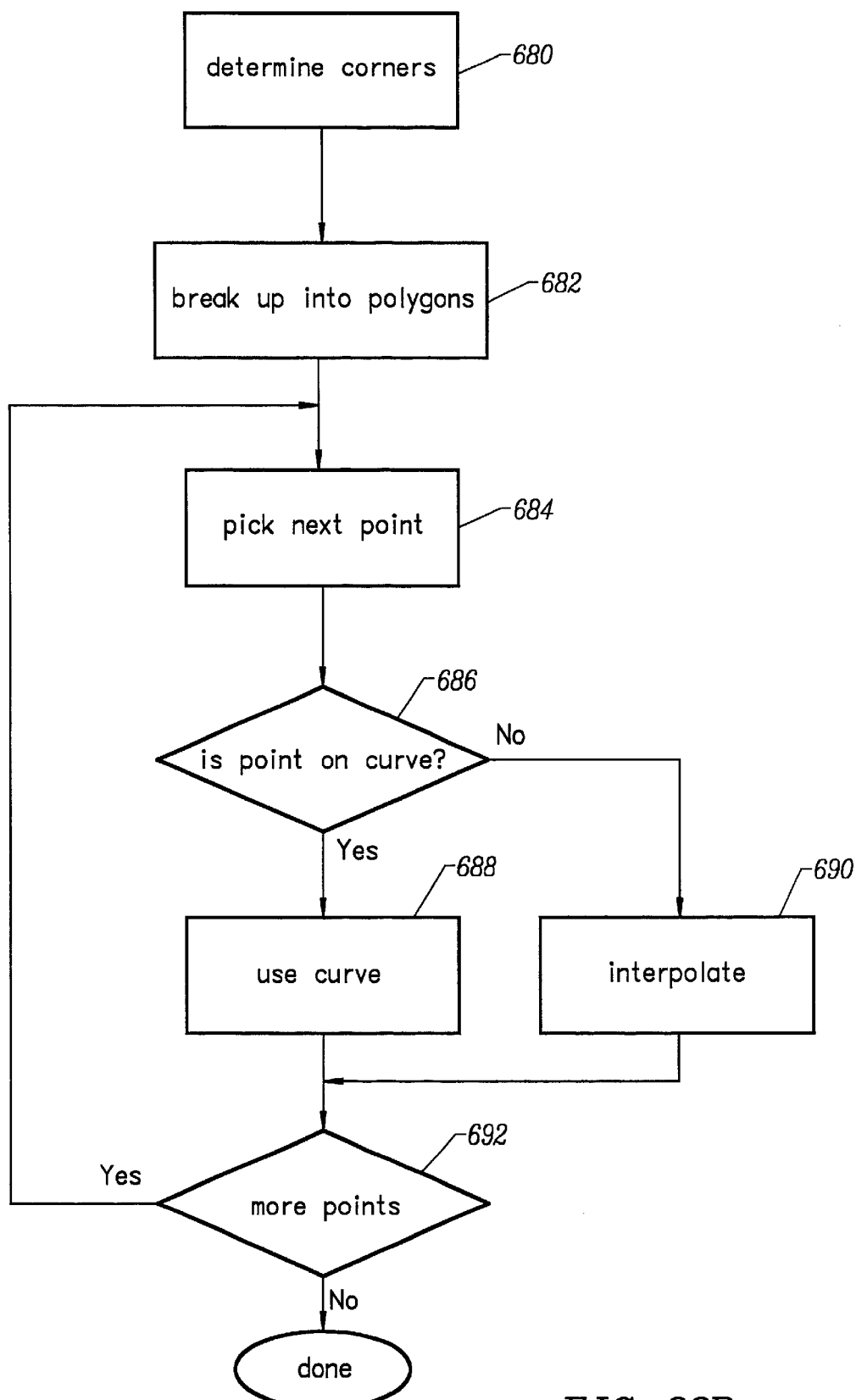
FIG. 22B is a flow chart describing a second embodiment of the method of determining three-dimensional locations.

FIG. 22B describes a method for an alternative embodiment of step 604 of FIG. 21. This method may be more suitable for adding logos. In step 680, main computer 94 determines the four corners of a rectangle bounding the logo or other graphic. That is, if the operator entered one or more vertices of the logo in step 602 and main computer 94 knows the size of the rectangle, then computer 94 can determine the location on the model of the four corners of the rectangle in step 680. In step 682, the rectangle bounding the logo is broken up into a plurality of rectangles. Each of these rectangles has four vertices. Each of these vertices represents a point for which a three-dimensional location is needed. Because the system knows the x and y coordinates of the four vertices and also knows how big the polygons are, the system can determine the x and y coordinates of each vertex. In step 684, main computer 94 takes the next point to be considered from the set of vertices. In step 686, main computer 94 determines whether this point is on a preexisting curve. If it is, that curve is used to determine the z coordinate for the point in step 688. If it is not on a curve, then the system interpolates between the two nearest curves in step 690 in order to determine the z coordinate. After steps 688 or 690, the system determines whether there are any more points to be considered (step 692). If not, the method of FIG. 22B is done. If there are more points to consider, then main computer 94 loops back to step 684. At the conclusion of the method of FIG. 22B, main computer 94 has a set of three-dimensional locations for the vertices of the rectangles making up the larger rectangle that bounds the graphic.

In an alternative embodiment, a logo can be added by simply using the four corners of the rectangle that bounds the logo. Only these four corners would be operated on in steps 684–692. Thus, at the end of the method of FIG. 22B, the system would have three-dimensional locations for the four corners of the bounding rectangle. These four corners would be transformed to two-dimensional positions and the graphic can be built by inserting the rectangle at the transformed two-dimensional positions. A simple method for rendering the graphic into the four two-dimensional coordinates is to use the Open GL functions provided with a Silicon Graphic O2 workstation.

In one embodiment when adding logos, it may be useful to defocus the logo for a more realistic image. Alternatively, the logo can appear completely focused at certain zoom levels and slightly unfocused at other zoom levels. In another alternative, the logo can be placed over the field to be slightly transparent (the alpha for keyer being slightly less than 100% foreground). This method will allow some of the texture of the background to appear in the video.

Figure 23:
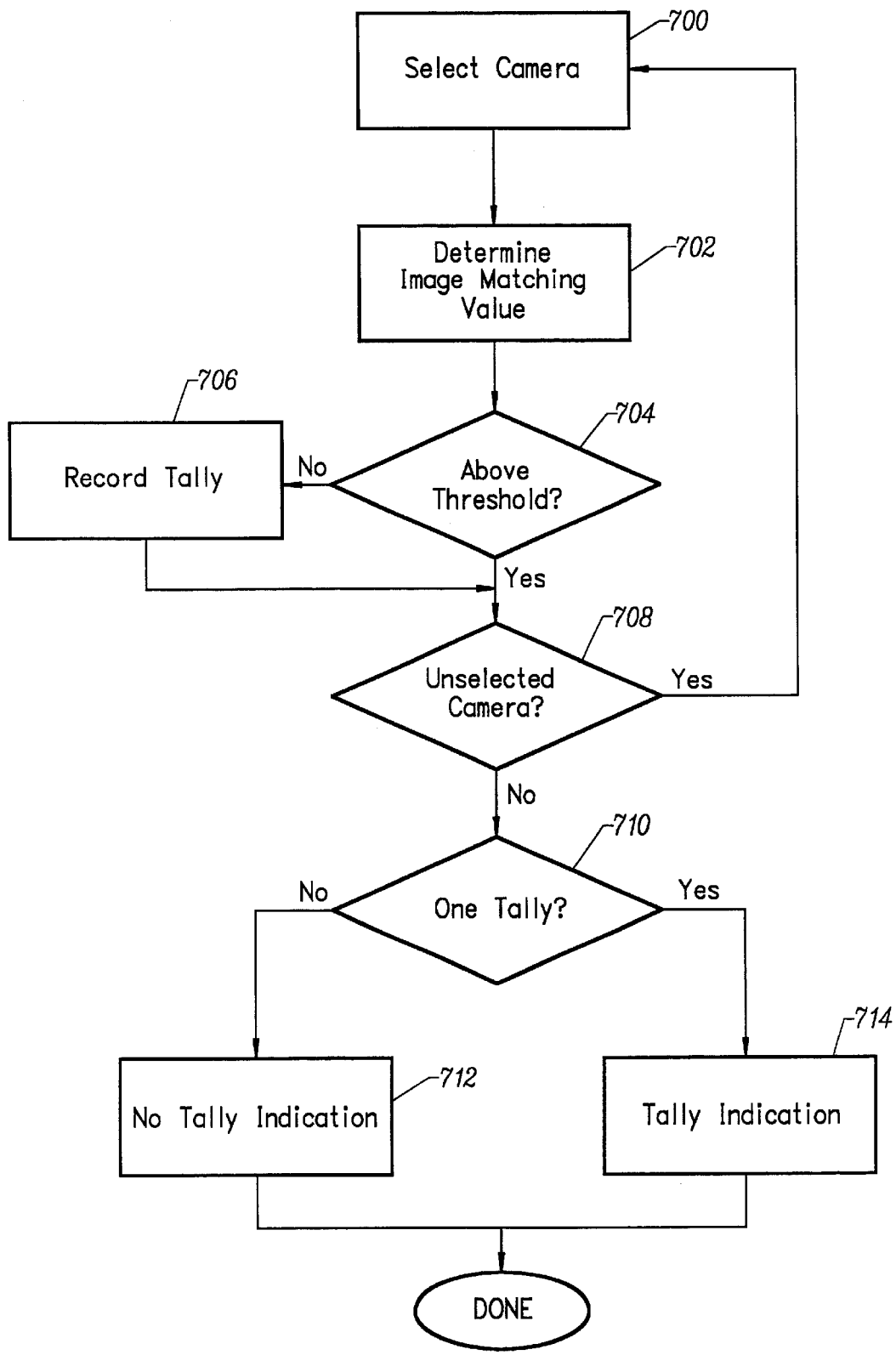
FIG. 23 is a flow chart describing the method of determining which camera is tallied.

FIG. 23 illustrates a sequence of operations performed by tally detector 88 when making the determination of which camera (if any) in the set of cameras 60, 62, and 64 is tallied (step 606 of FIG. 21). First, a camera is selected in step 700. Once a camera is selected, an image matching value is determined based on the program signal 89 and the selected camera's video in step 702. The image matching value is determined as described above. As described above with respect to FIG. 13, only a selected set 436 of samples 434 from a test region 428 are employed for calculating the image matching value. This is beneficial during the operation of tally detector 88, because in some instances graphics are added to program video in the non-selected test region 428 areas. An example of such a graphic is a game clock in the upper right hand corner of the program video. This graphic is added to the broadcast program video prior to the calculation of an image matching value and will not appear in the selected camera's video. Accordingly, an image matching value that is determined using the entire test region of the broadcast program video will most likely indicate an image mismatch, even though the selected camera may be providing the broadcast program video. Employing only the selected set 436 of samples 434 avoids this problem.

After an image matching value is determined, tally detector 88 determines whether the image matching value is within a predefined threshold in step 704. The predefined threshold in one embodiment of the present invention is a maximum image matching value that must not be exceeded by the calculated image matching value. In one embodiment of the present invention, the predefined threshold is equal to 32 times the number of pixels that are employed in determining the image matching value.

If the image matching value is equal to or below the predefined threshold, tally detector 88 records that the selected camera is tallied in step 706. Once the recording (706) is made or it is determined that the image matching value is above a predefined threshold (704), a determination is made of whether any of the cameras 60, 62, and 64 have not yet been selected in step 708. If any of the cameras have not yet been selected, then a new camera is selected in step 700 and an image matching value is determined and evaluated as described above. If all of the cameras have been selected, then it is determined whether there is only a single camera that has been recorded as being tallied in step 710.

If only a single camera has been recorded as being tallied, then tally detector 88 provides an indication that the tallied camera is providing the program video in step 714. However, if it is determined that either multiple or none of the selected cameras are tallied, then tally detector 88 provides an indication that there is no tallied camera in step 712. In an alternate embodiment, if a first camera has continuously been identified as tallied to provide broadcast program video and a second camera briefly becomes recorded as tallied in step 706, then tally detector 88 will continue to indicate that the first camera is tallied and ignore the brief tally on the second camera. After either identifying that there is no tallied camera (712) or identifying a tallied camera (714), the process of detecting a tallied camera is done.

When multiple cameras have been recorded as tallied, tally detector 88 provides an indication that no camera is tallied because it is unclear which camera's view information must be used to enhance the program video. Thus, when tally detector 88 provides an indication that no camera is tallied, step 612 of FIG. 21—enhance video—is not performed.

In alternate embodiments of the present invention, the determination of which camera 60, 62, and 64 is tallied can be made by employing the closure switch signals (CS1, CS2, and CS3) that are received by tally detector 88. In one embodiment, a camera is only recorded as being tallied (step 706 in FIG. 22) when the image matching value is within a predefined threshold and the selected camera's closure switch signal indicates that the camera is "On Air." In alternate embodiments of the present invention, the closure switch signals could be used to identify the tallied camera, if the sequence of operations shown in FIG. 23 became unexpectedly disabled or are inconclusive, or if the closure switch signals for all cameras used for the event are coupled to tally detector 88. In further embodiments of the present invention, the tally detector GUI includes a manual switch that can be asserted for any one of the camera images to cause the chosen camera to be identified as tallied for broadcast. In one embodiment, if tally detector 88 determines in step 710 that there was more or less than one tally indicated, rather than output no tally (step 712), tally detector 88 can send the identity of the camera that is indicated by the closure switch signals or the camera identified manually by the operator.

Figure 24:
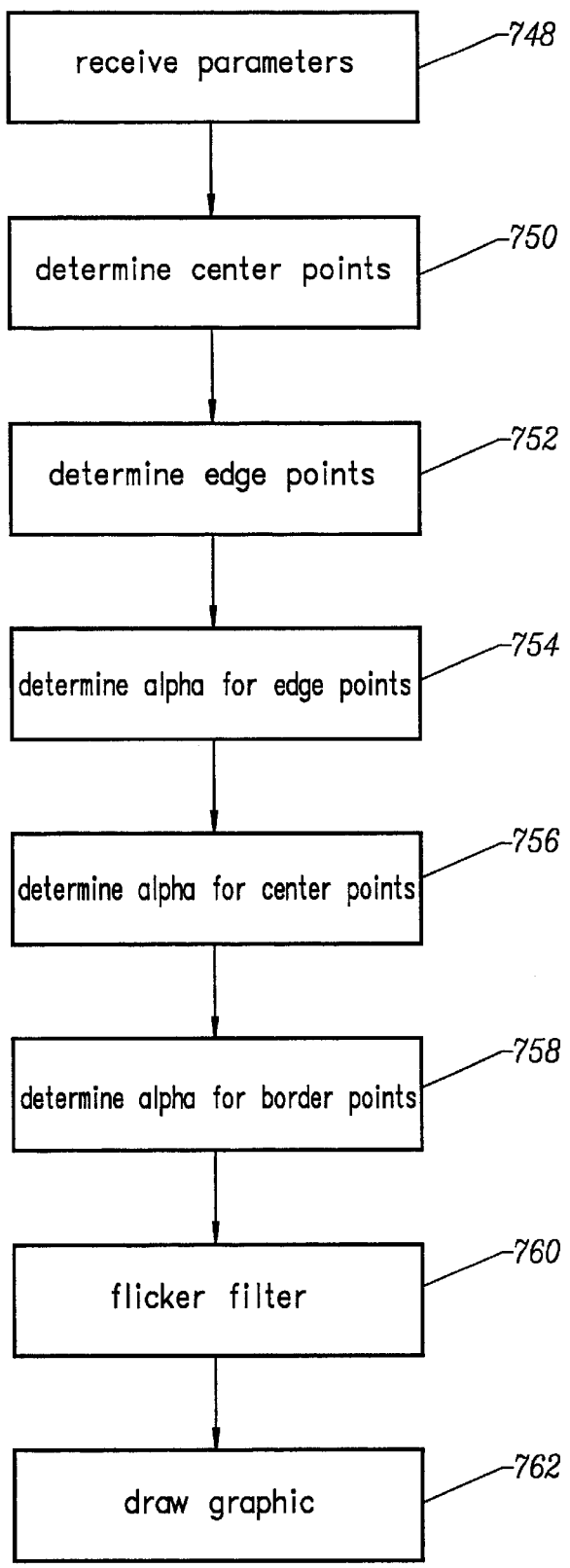
FIG. 24 is a flow chart that explains one embodiment of the process of enhancing video.

FIG. 24 illustrates a sequence of operations performed in one embodiment of the present invention for enhancing the video. First, a set of parameters are obtained in step 748 for use in building the graphic. The parameters include edge fraction, nominal center point alpha, nominal edge point alpha, and border point alpha. These parameters will be explained in greater detail as they are introduced below. Once the parameters are obtained, a set of center points for the graphic is determined in step 750. The center points are pixel locations in the graphic that are positioned between the graphic's border points. As explained above with reference to FIGS. 21, 22A, and 22B, a set of three dimensional border points for the graphic is determined is step 604 (FIG. 21) and converted into a set of two-dimensional border points in step 610 (FIG. 21). In determining the center points, interpolation is employed in one embodiment to place a center point between a pair of border points.

Figure 25:
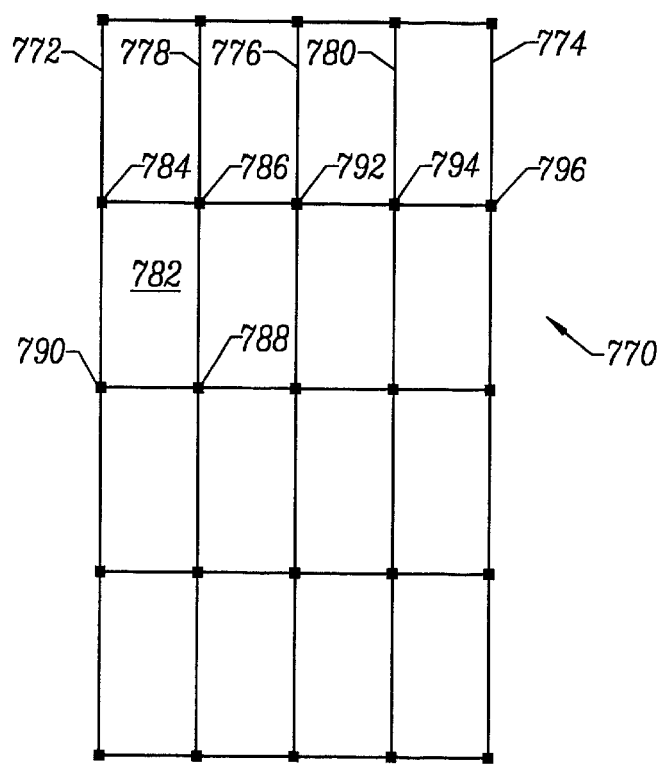
FIG. 25 symbolically represents a portion of a line formed in accordance with the method of FIG. 24.

FIG. 25 is a symbolic representation of a portion of an exemplar line 770, which is one possible embodiment of a graphic. A symbolic center line 776 is depicted which connects the set of center points determined in step 750. Also depicted are border lines 772 and 774, which symbolically connect the border points. Each center point is located between two border points. In one embodiment of the present invention, each center point lies midway between its two associated border points, while in an alternate embodiment center points can be located in positions other than midway between its two associated border points.

Once a set of center points has been established, edge points are determined in step 752. In one embodiment, the edge points are pixel locations that reside between a center point and a border point. In such an embodiment, the location of each edge point is based on a desired edge fraction. The edge fraction defines the distance between the edge point and a corresponding center point as a percentage of the distance between the center point and the border point that the edge point lies between. In other embodiments of the present invention, the location of each edge point can be determined by alternate means, such as interpolating, receiving the location from a system user, or assigning a predefined value. In further embodiments, the edge points are located in places other than between a center point and a border point.

FIG. 25 shows edge lines 778 and 780. Each edge line symbolically connects its respective set of edge points. The edge lines, border lines and center lines are drawn in FIG. 25 for illustration purposes. In one embodiment, the number of edge points along an edge line is equal to the number of center points. Each edge point lies between a border point and a center point. For example, edge point 786 lies between border point 784 and center point 792. The edge fraction is equal to the distance between edge point 786 and center point 792 divided by the distance between center point 792 and border point 784. In alternate embodiments of the present invention different edge fractions may be employed. For example, the edge fraction can be the percentage of the distance between the two borders.

Figure 27:
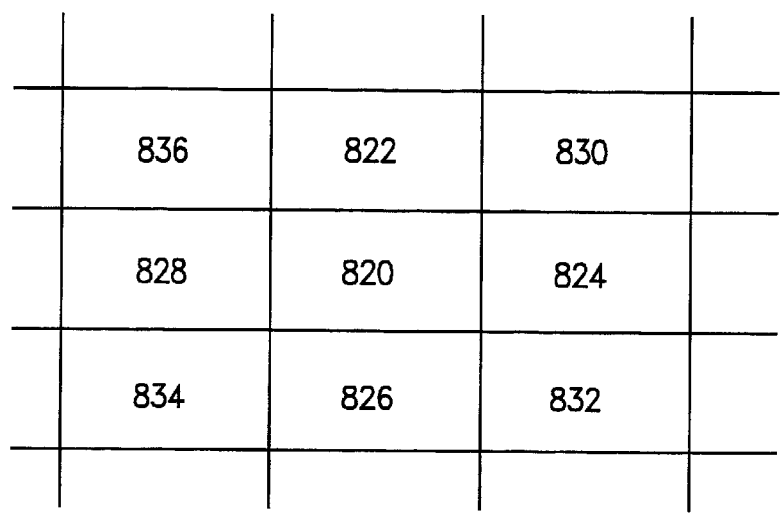
FIG. 27 symbolically represents a portion of a frame from the program video.
Figure 26:
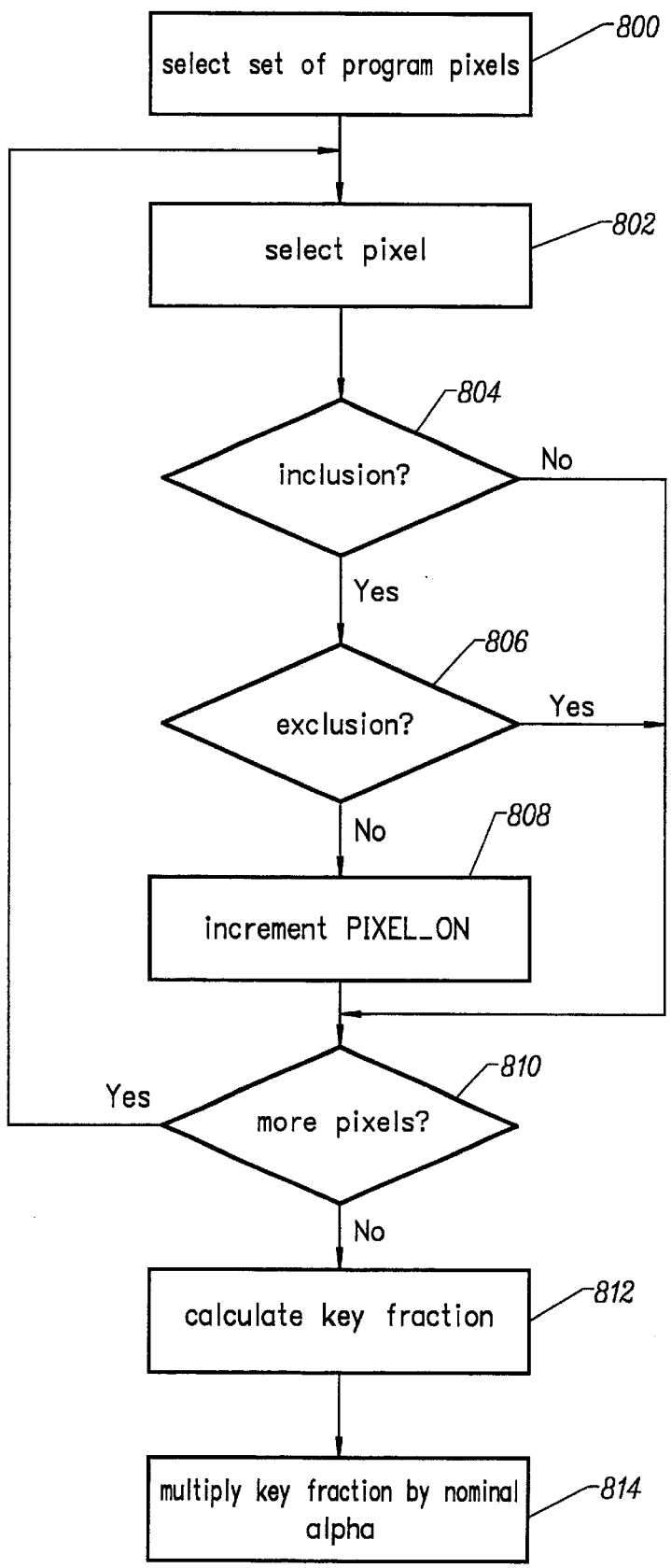
FIG. 26 is a flow chart that explains the step of determining alphas for edge points.

Once the edge points have been determined, alphas are determined for each of the edge points in step 754. In one embodiment, an edge alpha is the product of a key fraction value multiplied by a nominal edge point alpha. FIG. 26 shows a sequence of operations for determining an alpha for an edge point in one embodiment of the present invention. First, a corresponding set of pixels in the program video is selected in step 800. FIG. 27 illustrates nine pixels that are part of a frame from the program video. Pixel 820 represents a pixel in the program video that has the same position as the edge point for which an alpha is being calculated. Pixel 820 along with a set of the pixels surrounding pixel 820 are selected in step 800 for use in determining the key fraction for the selected edge point. In one embodiment of the present invention, the set of pixels includes pixels 820, 822, 824 826 and 828. In an alternate embodiment, the set of pixels includes pixels 820,822,824,826,828,830,832,834 and 836. In yet another embodiment, the set of pixels only includes pixel 820. Step 800 also includes initializing a PIXEL__ON counter to zero.

Once the set of pixels is selected, one of the pixels in the set is selected in step 802. It is then determined in step 804 whether the selected pixel is an inclusion pixel. In one embodiment, this determination is made by determining whether the selected pixel has a pixel characteristic set that falls within a pass band of any of the inclusion filters. For example, when the YCbCr format is employed, it is determined whether the selected pixel has a Y characteristic, Cb characteristic, and Cr characteristic that each fall within the Y characteristic pass band, Cb characteristic pass band, and Cr characteristic pass band for any one of the inclusion filters. If it is determined that the selected pixel is not an inclusion pixel, then it is determined in step 810 whether there are more pixels in the set of program pixels to be considered.

If it is determined that the selected pixel is an inclusion pixel, then the determination is made in step 806 of whether the selected pixel is an exclusion pixel. In one embodiment, this determination is made by determining whether the selected pixel has a pixel characteristic set that falls within the pass bands of an exclusion filter. In an alternate embodiment, additional criteria other than a pixel characteristic set are employed to determine whether the selected pixel is an exclusion pixel. One such example is the use of an exclusion filter designating excluded screen locations, as described above with reference to FIG. 20.

If, in step 806, the pixel is determined not to be an exclusion pixel, then a PIXEL__ON value is incremented in step 808. Once the PIXEL__ON value is incremented, the determination is made in step 810 of whether there are more pixels to be selected from the selected set of pixels. If it is determined that the pixel is an exclusion pixel, then a determination is made in step 810 of whether there are any more pixels to be considered (step 810). If there are more program pixels to be considered, then a new pixel from the set is selected in step 802. Otherwise, a key fraction is calculated in step 812. In one embodiment of the present invention, the key fraction is calculated by dividing the PIXEL__ON value by the total number of pixels in the selected set of program pixels. For example, if the set of program pixels includes pixels 820, 822, 824, 826 and 828; and pixels 820, 822, 824 and 828 are inclusions (and not exclusions) then the key fraction is ⅘. It is contemplated that other means can be employed to determine the key fraction.

Once the key fraction is calculated, the alpha value for the edge point (called the edge point alpha) is determined in step 814. In one embodiment, the edge point alpha is determined by multiplying the nominal alpha for the edge point by the key fraction for the edge point. The above described process is repeated for each of the edge points in the graphic.

After alphas have been determined for each of the edge points, alphas are determined for each of the center points in step 756. In determining an alpha for each center point, a key fraction is determined for the center point and multiplied by a nominal alpha value for the center point. In one embodiment of the present invention, the key fraction for each center point is determined based on the key fractions for the edge points that bound the center point. For example, as shown in FIG. 25, the key fraction for center point 792 is based on the key fractions for edge points 786 and 794. In one embodiment, the key fraction for each center point is equal to the average of the key fractions for the edge points that bound the center point. In an alternate embodiment of the present invention, the key fraction for each center point is equal to the lowest of the key fractions for the edge points that bound the center point. In yet another embodiment of the present invention, the key fraction for each center point is determined as described above with respect to the edge points. In yet another embodiment, the key fraction for the center point is provided in step 748 or it can be based on another pixel's key fraction or value. Once a key fraction is determined for a center point, the key fraction is multiplied by the center point's nominal alpha to obtain the alpha for the center point.

Once an alpha has been obtained for each center point, an alpha is determined for each of the border points in step 758. In one embodiment of the present invention, the alpha for each border points is set to a predetermined value. In one embodiment, the predetermined value is zero. By setting the border points to zero, aliasing at the edges of the graphic can be avoided. In another embodiment, the predetermined value of the border point alphas can be defined as a parameter in step 748 by a user of the system in FIG. 2 using the system's GUI. In other alternate embodiments of the present invention, the alpha for each border point is determined as described above with respect to the edge points in step 754. The border points can be determined using the steps of FIG. 26, when the graphic is a logo in which anti-aliasing at the borders of the graphic has already been provided for through the use of an alpha mask.

After alphas have been determined for the boundary points, in one embodiment of the present invention, a flicker filter operation is performed in step 760. The flicker filter is employed to reduce flickering in the appearance of the graphic. The flicker filter averages a newly calculated alpha for the pixel with past and future alphas for the same pixel to generate a filtered alpha. In one embodiment of the present invention, the flicker filter operation is performed according to the following equation:

$$\alpha_F = \frac{(\Sigma \alpha_{FP} + \alpha + \Sigma \alpha_U)}{N}$$

wherein
  $\alpha_F$ is the filtered alpha;
  $\Sigma \alpha_{FP}$ is a summation of filtered alphas for the selected pixel in prior video frames;
  $\alpha$ is the unfiltered alpha of the selected pixel for the current video frame;
  $\Sigma \alpha_u$ is a summation of unfiltered alphas for the selected pixel for future video frames; and
  N is a number of values being averaged.

It is possible to obtain filtered alphas for pixels using future alpha values, because delays in the system shown in FIG. 2 provide for the calculation of alphas several frames in advance of their use. In one embodiment, $\Sigma \alpha_{FP}$ is the sum of the selected pixel's filtered alphas for the two video frames preceding the current video frame; $\Sigma\alpha_{FP}$ is the sum of the selected pixel's filtered alphas for the two video frames following the present video frames; and N is equal to 5. In an alternate embodiment, the summation of filtered alphas for the selected pixel in prior video frames ($\Sigma\alpha_{FP}$) is replaced by a summation of unfiltered alphas for the selected pixel in prior video frames. In one embodiment of the present invention, the flicker filter operation is applied to the alphas of the center points, border points and edge points. In alternate embodiments, the flicker filter is applied to only a subset of the alphas of the center points, border points, and edge points. In yet another embodiment, the flicker filter is applied to each pixel to be blended. In further embodiments, the flicker filter operation is not employed. In still further embodiments, values of alphas from different times can be weighted differently.

Once the flicker filter operation is completed, or all of the unfiltered alphas have been obtained in an embodiment in which the flicker filter is not employed, the graphic is drawn in step 762. In drawing the graphic, a frame that includes the graphic is rendered and alphas are determined for each graphic pixel in the frame. When rendering the graphic, each pixel's location and fill characteristics are determined. The fill characteristics and alpha are then sent to the keyer 98 for blending with the program video.

One embodiment of the present invention includes dividing the graphic into regions with each region being defined by a set of vertices, in which each vertex is either an edge point, a center point or a boundary point. For example, as shown in FIG. 25, when line 770 is drawn, it is divided into regions that are defined by either a pair of edge points and a pair of border points, or a pair of center points and a pair of edge points. For example, region 782 is defined by border point 784, border point 790, edge point 788, and edge point 786.

For each region, the fill characteristics and alpha of each of vertex of the region is employed to establish the fill characteristic and alpha for each pixel within the region. For example, line 770 shown in FIG. 25 can be rendered with all pixels having the same fill characteristics and varying alphas. In such an embodiment, the fill characteristics for the vertices (784, 786, 788, 790) defining region 782 are the same. These fill characteristics are then applied to each of the pixels within region 782. The alpha for each of the pixels in region 782 is determined by using interpolation based on the alphas for each vertex (784, 786, 788, 790) defining region 782.

In one embodiment of the present invention, a computer generates and supplies the line 770, by executing instructions from a program stored in memory. In one embodiment, the computer uses the Open GL language and generates a set of polygons using a glBegin, glEnd command in conjunction with a GL_QUADS instruction. The GL_QUADS instruction provides sets of vertices to the glBegin, glEnd command for drawing quadrilaterals. Also provided are the alphas and fill characteristics for each vertex. A quadrilateral is generated by the glBegin, glEnd command for each set of four vertices that is provided.

In an alternate embodiment to the present invention, graphics can be provided with regions that have more or fewer than four vertices and/or different fill characteristics for each of the vertex pixels. When a different number than four vertices are employed, the segments that are rendered will be a shape other than a quadrilateral. When different fill characteristics are provided for each vertex pixel, in one embodiment of the present invention, bilinear interpolation is employed to determine the fill characteristics for each of the pixels in the region based on the fill characteristics for the region's vertex pixels.

For line 770, FIG. 25 depicts only two edge lines 778 and 780. In alternate embodiments of the present invention, there can be more than two edge lines. By using multiple edge lines and different nominal alphas for the different edge lines, different effects can be achieved for drawing the graphic.

In one embodiment for using a logo, there are two border lines, no center lines and nine equally spaced apart edge lines, thereby forming 100 equally sized polygons representing the graphic. In such an embodiment, the alpha for each of the border points and edge points are determined as described above in step 754 with respect to edge points.

In one embodiment of the present invention, computer 94 is used to perform all of the steps described in FIG. 24. In an alternate embodiment of the present invention, the process steps described in FIG. 24 are shared between computer 94 and computer 96. In one such embodiment, the steps of drawing a graphic 762 and employing the flicker filter operation 760 are performed by computer 96, while the other steps are performed by computer 94. Computer 94 provides computer 96 with locations for each of the center points and boundary points, the alphas for each of the boundary points, center points, and edge points, and the edge fraction. Computer 96 then determines the location of the edge points based on the edge fraction as described above with respect to step 752 in FIG. 24. In yet another embodiment of the present invention, the flicker filter 760 is employed by computer 94, so that computer 96 receives filtered alpha values for the center points, border points, and edge points.

In further embodiments of the present invention, each pixel in the graphic can be analyzed individually to determine its alpha. In one such embodiment, the above described process for determining the alpha for an edge point (754 in FIG. 24) is employed for each of the pixels in the graphic.

An alpha signal is one example of a blending coefficient. A blending coefficient is a value used to indicate how to blend one image or video with a second image or video. The above discussion describes a means for determining alphas for various pixels and using the determined alphas for blending a graphic using a keyer or a computer. It is contemplated that other technologies can be used to blend the graphic and that these other technologies may use different blending coefficients than an alpha signal.

The foregoing detailed description of the invention has been presented for purposes of illustration and description. It is not intended to be exhaustive or to limit the invention to the precise form disclosed, and obviously many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. The invention is, thus, intended to be used with many different types of live events including various sporting events and non-sporting events. It is intended that the scope of the invention be defined by the claims appended hereto.

We claim:
1. A method of enhancing video, comprising the steps of:
receiving a selection of a location in an environment;
determining a set of coordinates of said location in said environment using an existing three dimensional model of at least a portion of said environment;

receiving field of view data for a first camera, determining whether said first camera is tallied based on comparing a video signal from said first camera to a tallied video signal;

converting said set of coordinates of said location to position data representing a position in a video image from said first camera, said step of converting is based on said field of view data; and enhancing said video image from said first camera based on said position data if said first camera is tallied.

2. A method of enhancing video, comprising the steps of:

receiving a selection of a location in an environment, said step of receiving a selection includes receiving a selection of a location for a vertex of a rectangle bounding a logo;

determining a set of coordinates of said location in said environment using an existing three dimensional model of at least a portion of said environment, said step of determining a set of coordinates includes determining a set of sub-rectangles and determining three dimensional coordinates of vertices of said sub-rectangles;

converting said set of coordinates of said location to position data representing a position in said video, said step of converting said set of coordinates converts said three dimensional coordinates of said vertices of said sub-rectangles to a set of positions in said video; and enhancing said video based on said position data, said step of enhancing includes adding said logo to said video based on said set of positions.

3. A method according to claim 1, wherein said step of receiving a selection includes receiving a selection of a location on a field;

said step of determining a set of coordinates includes determining a first subset of points and a second subset of points at said location, said first subset of points represents a first border for a line graphic, said second subset of points represents a second border of said line graphic;

said step of converting said set of coordinates converts said first subset of points to a first set of positions and said second subset of points to a second set of positions; and said step of enhancing includes adding said line graphic to said video based on said first set of positions and said second set of positions.

4. A method according to claim 1, wherein:

said step of receiving a selection includes receiving an indication of a yard from a keyboard.

5. A method according to claim 1, wherein:

said step of receiving a selection includes receiving data from a pointing device.

6. A method according to claim 1, wherein:

said location is a wall on a stadium.

7. A method according to claim 1, wherein:

said location is space between goal posts.

8. A method according to claim 1, wherein:

said step of enhancing includes keying a graphic of a line over a frame of video captured by said first camera.

9. A method according to claim 1, wherein:

said step of enhancing includes editing a frame of video.

10. A method according to claim 1, wherein:

said step of converting includes multiplying said coordinates by a transformation matrix.

11. A method according to claim 10, wherein said step of determining a set of coordinates includes the steps of:

determining whether said model includes information for said location; and interpolating to determine said set of coordinates if said model does not include said information for said location.

12. A method according to claim 1, further including the step of:

creating said model.

13. A method according to claim 1, wherein:

said step of enhancing adds a line to said video at a first position based on said position data; and said method further including the step of manually adjusting said first position.

14. A method according to claim 1, wherein:

said step of determining does not utilize pattern recognition.

15. A method according to claim 1, further including the step of:

creating inclusion criteria defining at least two colors of inclusion, said step enhancing includes editing pixels that meet said inclusion criteria.

16. A method according to claim 1, wherein:

said set of coordinates of said location are in a first coordinate system; and said position data includes coordinates in a second coordinate system.

17. A method according to claim 1, wherein:

said set of coordinates of said location are three dimensional coordinates in a first coordinate system; and said position data includes two dimensional coordinates in a second coordinate system.

18. A method according to claim 1, further including the step of:

performing a flicker filter based on said position data.

19. A method according to claim 1, wherein:

said step of enhancing includes adding an unfocused version of a logo to said video image from said first camera at a first zoom level and adding a focused version of said logo at a second zoom level.

20. A method according to claim 1, wherein:

said step of selecting includes indicating a location of a first down; and said step of enhancing includes adding a first down line to said video image from said first camera.

21. A method according to claim 1, further including the steps of:

identifying at least two inclusion colors; and identifying at least one exclusion color, said step enhancing includes editing pixels that include an inclusion color and not an exclusion color.

22. A method according to claim 21, wherein:

at least one color is an inclusion color and an exclusion color.

23. A method of enhancing video, comprising the steps of:

receiving a selection of a location in an environment;

determining a set of coordinates of said location in said environment using an existing three dimensional model of at least a portion of said environment;

receiving field of view data for a first camera;

determining whether said first camera is tallied based on comparing video captured by said first camera to a tallied video signal;

converting said set of coordinates of said location to position data representing a position in said video captured by said first camera, said step of converting is based on said field of view data for said first camera if said first camera is tallied; and enhancing said video captured by said first camera based on said position data if said first camera is tallied.

24. A method according to claim 23, further including the steps of:

creating inclusion criteria defining at least two colors of inclusion, said step enhancing includes editing pixels that meet said inclusion criteria.

25. One or more processor readable storage devices having processor readable code embodied on said processor readable storage devices, said processor readable code for programming one or more processors to perform a method comprising the steps of:

receiving a selection of a location in an environment;

determining a set of coordinates of said location in said environment using an existing three dimensional model of at least a portion of said environment;

receiving field of view data for a first camera;

determining whether said first camera is tallied based on comparing a video signal from said first camera to a tallied video signal;

converting said set of coordinates of said location to position data representing a position in a video image from said first camera, said step of converting is based on said field of view data; and directing an enhancement to said video image from said first camera based on said position data if said first camera is tallied.

26. One or more processor readable storage devices according to claim 25, wherein:

said step of directing an enhancement directs the addition of a line to said video image from said first camera.

27. One or more processor readable storage devices according to claim 25, wherein said method further includes the step of:

creating inclusion criteria defining at least two colors of inclusion, said step directing an enhancement includes causing the editing of pixels that meet said inclusion criteria.

28. An apparatus for enhancing video captured by a first camera, comprising:

a first set of one or more field of view sensors adapted to sense field of view information for said first camera;

one or more processors in communication with said first set of one or more field of view sensors;

a tally detector, said tally detector determines whether said first camera is tallied based on comparing a video signal from said first camera to a tallied video signal;

one or more processor readable storage units in communication with said processors, said processor readable storage units storing processor readable code for programming said processors to perform a method comprising the steps of:

receiving a selecting of a location in an environment, determining a set of coordinates of said location in said environment using an existing three dimensional model of at least a portion of an environment, converting said set of coordinates of said location to position data representing a position in a video image from said first camera, said step of converting is based on said field of view data, and directing an enhancement to said video image from said first camera based on said position data if said first camera is tallied.

29. An apparatus according to claim 28, further including:

video modification hardware in communication with processors, said video modification hardware enhances said video.

30. An apparatus according to claim 28, wherein:

said video modification hardware includes a keyer.

31. An apparatus according to claim 28, further including:

a second camera;

a second set of one or more field of view sensors for said second camera, said second set of one or more field of view sensors in communication with said processors;

a third camera; and a third set of one or more field of view sensors for said third camera, said third set of one or more field of view sensors in communication with said processors, said tally detector determines whether said second camera is tallied and whether said third camera is tallied.

32. A method of enhancing video, comprising:

manually selecting a location to be highlighted;

receiving field of view data for a first camera;

determining whether said first camera is tallied based on comparing a video signal captured by said first camera to a tallied video signal;

determining said location's position in video from said first camera, said step of determining is based on said field of view data;

adding a graphic to video from said first camera at a first position based on said location's position in said video if said first camera is tallied; and manually adjusting said first position.

33. A method according to claim 32, wherein:

said graphic is a line; and said first position is said location's position in said video.

34. A method according to claim 32, further including the step of:

creating inclusion criteria defining at least two colors of inclusion, said step adding includes editing pixels that meet said inclusion criteria.

35. A method of enhancing video, comprising the steps of:

receiving first video from a first camera;

determining whether said first camera is tallied based on comparing said first video to a tallied video signal; and enhancing said first video if said first camera is tallied.

36. A method according to claim 35, further including the steps of:

receiving second video from a second camera;

determining whether said second camera is tallied based on comparing said second video to said tallied video signal;

enhancing said second video if said second camera is tallied;

receiving third video from a third camera;

determining whether said third camera is tallied based on comparing said third video to a tallied video signal; and enhancing said third video if said third camera is tallied.

37. A method according to claim 36, further including the steps of:

selecting a location to be highlighted; and determining said location's position in said first video if said first camera is tallied;

determining said location's position in said second video if said second camera is tallied; and determining said location's position in said third video if said third camera is tallied, said steps of enhancing are based on said location's position in said first video if said first camera is tallied, said steps of enhancing are based on said location's position in said second video if said second camera is tallied and said steps of enhancing are based on said location's position in said third video if said third camera is tallied.

38. A method according to claim 35, further including the steps of:

receiving an indication of a location; and determining a position in said first video of an image of said location, said step of enhancing said first video is based on said position.

39. A method according to claim 35, wherein:

said step of enhancing includes adding a first down line to said first video.

40. A method according to claim 35, further including the step of:

receiving a selection of a location in an environment;

determining a set of coordinates of said location in said environment using an existing three dimensional model of at least a portion of said environment; and converting said set of coordinates of said location to position data representing a position in said first video, said step of enhancing is based on said position data.

41. A method according to claim 40, further including the steps of:

identifying at least two inclusion colors; and identifying at least one exclusion color, said step enhancing includes editing pixels that are an inclusion color and not an exclusion color.

42. A method according to claim 41, wherein:

at least one color is an inclusion and an exclusion.

43. A method according to claim 35, further including the steps of:

identifying at least two colors of inclusion; and identifying at least one color of exclusion, said step enhancing includes editing pixels that are an inclusion and not an exclusion.

44. An apparatus for enhancing video captured by a first camera, comprising:

a tally detector receiving a video signal from a first camera and a tallied video signal, said tally detector compares said video signal from said first camera to said tallied video signal and reports whether said first camera is tallied;

a processor in communication with said tally detector;

a processor readable storage unit in communication with said processor, said processor readable storage unit storing processor readable code for programming said processor to enhance said video if said first camera is tallied.

45. An apparatus according to claim 44, further including:

a second camera in communication with said tally detector; and a third camera in communication with said tally detector.

46. An apparatus according to claim 44, further including:

a pan sensor for said first camera; and a tilt sensor for said second camera, said pan sensor and said tilt sensor being in communication with said processor, said processor accesses an indication of a location in three dimensional space and converts said location to a position in said video based on information from said pan sensor and said tilt sensor, said processor enhances said video based on said position in said video.

* * * * *